(12) United States Patent
Hasegawa et al.

(10) Patent No.: US 7,167,896 B2
(45) Date of Patent: Jan. 23, 2007

(54) APPARATUS AND METHOD FOR CREATING AND SUPPLYING A PROGRAM VIA COMMUNICATION NETWORK

(75) Inventors: Yutaka Hasegawa, Hamamatsu (JP); Akitoshi Nakamura, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 608 days.

(21) Appl. No.: 09/992,106

(22) Filed: Nov. 21, 2001

(65) Prior Publication Data

US 2002/0065880 A1 May 30, 2002

(30) Foreign Application Priority Data

Nov. 27, 2000 (JP) .............................. 2000-359611

(51) Int. Cl.
*G06F 15/16* (2006.01)

(52) U.S. Cl. ..................... 709/203; 709/217; 709/229; 709/231; 707/204

(58) Field of Classification Search ................ 709/217, 709/229, 231, 203; 358/403; 707/204
See application file for complete search history.

(56) References Cited

U.S. PATENT DOCUMENTS

| | | | |
|---|---|---|---|
| 5,794,217 A |   | 8/1998 | Allen |
| 5,861,958 A | * | 1/1999 | Jamrog ........................ 358/403 |
| 5,926,624 A | * | 7/1999 | Katz et al. ................... 709/217 |
| 6,018,765 A |   | 1/2000 | Durana et al. |
| 6,065,056 A | * | 5/2000 | Bradshaw et al. ........... 709/229 |
| 6,256,554 B1 |   | 7/2001 | DiLorenzo |
| 6,374,266 B1 | * | 4/2002 | Shnelvar ..................... 707/204 |
| 6,434,621 B1 | * | 8/2002 | Pezzillo et al. ............. 709/231 |
| 6,560,651 B1 | * | 5/2003 | Katz et al. ................... 709/229 |

FOREIGN PATENT DOCUMENTS

| | | |
|---|---|---|
| EP | 0 627 690 | 12/1994 |
| EP | 0 864 990 | 9/1998 |
| EP | 0 971 296 | 1/2000 |
| JP | 10-150629 | 6/1998 |
| JP | 11-027649 | 1/1999 |
| WO | WO 96/26493 | 8/1996 |
| WO | WO 01/09864 | 2/2001 |

OTHER PUBLICATIONS

Merits and Manner of Ulilization of Free Network Services in Most Efficient Use, pp. 192-201, vol. 345 of Nikkei Pasakon issued Sep. 20, 1999 by Nikkei BP Sha.
RealSystem G2, pp. 98-105, vol. 12 of Nikkei Internet Technology issued Jun. 22, 1998 by Nikkei BP Sha.
Establish a Footing of XML, pp. 139-145, vol. 94 of SoftwareDesign issued Aug. 18, 1998 by Kabushiki Kaisha Gitutsuhyoronsha.

* cited by examiner

*Primary Examiner*—William Vaughn
*Assistant Examiner*—Thanh T Nguyen
(74) *Attorney, Agent, or Firm*—Morrison & Foerster LLP

(57) ABSTRACT

A program creation/supply apparatus connects with a client apparatus via a communication network, and prompts the client apparatus to select one or items of content and enter desired additional information in correspondence with the selected items of content. Program file is created on the basis of content selection information and the additional information transmitted from the client apparatus. The thus-created program file is added to a database. When a user selects a desired program, the program file of the selected program and one or more items of content defining the program are read out from the database and supplied to the user via the communication network. Also, content created by the user can be received via the network and added to the database. The content added to the database can be selected for use in program file creation.

19 Claims, 13 Drawing Sheets

<EXAMPLE OF INFOMATION DISPLAY>

<PROGRAM FILE>

| PROGRAM NAME | | | | |
|---|---|---|---|---|
| | REPRO.TIMIG | CONTENT URL | CONTENT ID | BASIC CONTENT INFO. |
| TR1 | REPRO.TIMIG | CONTENT URL | CONTENT ID | BASIC CONTENT INFO. |
| | : | : | : | : |
| | REPRO.TIMIG | CONTENT URL | CONTENT ID | BASIC CONTENT INFO. |
| TR2 | REPRO.TIMIG | CONTENT URL | CONTENT ID | BASIC CONTENT INFO. |
| | : | : | : | : |
| : | : | | | |

REPRODUCING SEQUENCE OF TRACKS ↓

APPARATUS AND METHOD FOR CREATING AND SUPPLYING A PROGRAM VIA COMMUNICATION NETWORK

BACKGROUND OF THE INVENTION

The present invention relates to a program creating/supplying apparatus, method, storage medium and computer program for creating and supplying a program, composed of music data, picture data and/or the like, that can be delivered via a communication network. For examples, the present invention concerns a technique that enables reproduction of a program comprising a mixture of plural types of content having different characters and easy creation of an original program precisely reflecting an intention of an interested user (listener/viewer).

Typical examples of the conventionally-known systems for distributing broadcast or other types of programs, comprised of music or picture data, include radio and television broadcasting systems. However, because radio and television programs are sent unidirectionally from broadcasting stations, interested users or audiences (listeners/viewers) are unable to listen to or view their desired programs at their desired time. Thus, "Internet broadcasting stations" have recently come on the scene as a new form of program distributing facility that is different from the existing radio and television broadcasting stations. The Internet broadcasting stations each distribute any of programs stored somewhere on a communication network, at an interested user's request; that is, on the basis of an interested user's request entered via a terminal (client) such as a personal computer (PC), the client station is connected to a World Wide Web (WWW) server by way of a communication network, such as the Internet, so that the client apparatus or terminal is supplied with a program of music piece or video (picture) data stored previously in the WWW server and then reproduces the program on the basis of the received data. Normally, for data delivery using a communication network, each WWW server delivers the data to a client apparatus or terminal on a streaming basis in such a manner that reproduction of a requested music piece, picture and/or the like can be initiated before reception of all the necessary data has been completed by the client terminal. With such an Internet broadcasting station, listeners/viewers are allowed to listen to or view any desired programs at any desired convenient time.

Program content to be distributed via a communication network can be diversified by just making the program of various different items of content. For that purpose, the programs have to be made to contain a plurality of items of content having different characters (e.g., different data formats) in a mixed fashion. However, with the above-mentioned Internet broadcasting stations, all the items of content in each one of the programs are constructed to have a same character (same data format). Namely, the Internet broadcasting stations today can not provide programs of diversified content due to the fact that the conventionally-known program creation/reproduction apparatus used in connection with the Internet broadcasting stations and the like are unable to reproduce programs containing a plurality of types of content having different characters in a mixed fashion (e.g., programs which comprise a mixture of plural types of content prepared in different data formats, such as content of MIDI music performance information, audio sounds and pictures).

Further, with the conventionally-known program creation/reproduction apparatus, interested users (listeners/viewers) can not create their own original programs by optionally combining a plurality of items of content.

SUMMARY OF THE INVENTION

In view of the foregoing, it is an object of the present invention to provide a program creation/supply apparatus and method which allows a user to readily create an original program via a communication network. For example, the present invention seeks to provide a program creation/supply apparatus and method and storage medium which allow a user to create and supply various information related to items of content to be reproduced one after another within a program.

To accomplish the above-mentioned objects, the present invention provides a program creation/supply apparatus connectable with a client apparatus via a communication network, which comprises: a storage section that stores a plurality of items of content and a program file defining one or items of content; and a processor section coupled with the storage section. The processor section is adapted to: prompt the client apparatus to select one or items of content and to input desired additional information in correspondence with the items of content selected by the client apparatus; and create a program file defined by the selected one or more desired items of content and including additional information, on the basis of content selection information and the additional information transmitted from the client apparatus via the communication network. When a program file is to be created by selecting one or items of content, the present invention allows a user of the client apparatus to input desired additional information in correspondence with the selected items of content, so that a program file including the input desired additional information can be created. Thus, there can be created an original program including additional information, such as comments about the content, freely input by the user. The thus-created original program is preserved on the communication network, and the user can access the original program, via the communication network, from any desired location and at any desired time. Program based on the created original program file is delivered in response to a request of the client apparatus having accessed the program creation/supply apparatus via the communication network. With such arrangements that a program file is created on the basis of inputs from the client apparatus and a program based on the thus-created program file is delivered via the communication network, the user himself (or herself) can readily create a user original program precisely reflecting an intention of the user, by selecting one or more desired items of content, and diversified user original programs created by users of the client apparatus can be distributed widely through the communication network.

The present invention also provides a program creation/supply apparatus connectable with a client apparatus via a communication network, which comprises: a storage section that stores a plurality of items of content and a program file defining one or items of content; and a processor section coupled with the storage section and adapted to: prompt the client apparatus to select one or more desired items of content; create a program file defined by the selected one or more desired items of content, on the basis of content selection information transmitted from the client apparatus via the communication network; and store the created program file in the storage section. With such arrangements, the present invention allows a user to create an original program file and preserve the thus-created original program file in the program creation/supply apparatus on the communication network. Further, because the present invention allows content based on all the program files, including newly created and additionally stored program files, to be delivered to the client apparatus in response to a selection by the client apparatus, the present invention can greatly diversify the contents of programs to be delivered.

The present invention also provides a program creation/supply apparatus connectable with a client apparatus via a communication network, which comprises: a storage section that stores a plurality of items of content and a program file defining one or items of content; and a processor section coupled with the storage section and adapted to: receive an item of content from the client apparatus via the communication network and additionally store the received item of content in the storage section; prompt the client apparatus to select one or more desired items of content from among the items of content, including the additionally stored item of content, stored in the storage section; and create a program file defined by the selected one or more desired items of content, on the basis of content selection information transmitted from the client apparatus via the communication network. With such arrangements, original content created by the user can be preserved in the program creation/supply apparatus on the communication network, and an original program file can be created using the user-created original content. Thus, the number of the types of content usable for creation of the program file can be significantly increased, so that the present invention can greatly diversify the contents of programs to be delivered. Further, each user of the client apparatus can come out with originality in creation of content.

The present invention also provides a program creation/supply apparatus connectable with a client apparatus via a communication network, which comprises: a storage section that stores a plurality of items of content and a program file defining one or items of content; and a processor section coupled with the storage section and adapted to: prompt the client apparatus to select one or more desired items of content; create a program file defined by the selected one or more desired items of content, on the basis of content selection information transmitted from the client apparatus via the communication network and additionally store the created program file in the storage section; prompt a given client apparatus on the communication network to select a desired program file from among a plurality of program files, including the additionally stored program file, stored in the storage section; and download, to the given client apparatus, the selected desired program file and content defining the selected desired program file, on the basis of program file selection information transmitted from the given client apparatus via the communication network. Thus, with this invention, the client apparatus can use the downloaded program file and content defining the downloaded program file on an offline basis. Because the present invention is arranged such that a desired program file, selected from among all the program files including newly created and additionally stored program files, and content based on the program file are delivered together to the client apparatus, the selected program can be reproduced by the client apparatus alone on an offline basis.

The present invention may be constructed and implemented not only as the apparatus invention as discussed above but also as a method invention. Also, the present invention may be arranged and implemented as a software program for execution by a processor such as a computer or DSP, as well as a storage medium storing such a program.

Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

First, an embodiment of a program reproduction system related to a first embodiment of a program creation/supply apparatus acccording to the present invention will be described with reference to FIGS. 1–9B.

Figure 1:
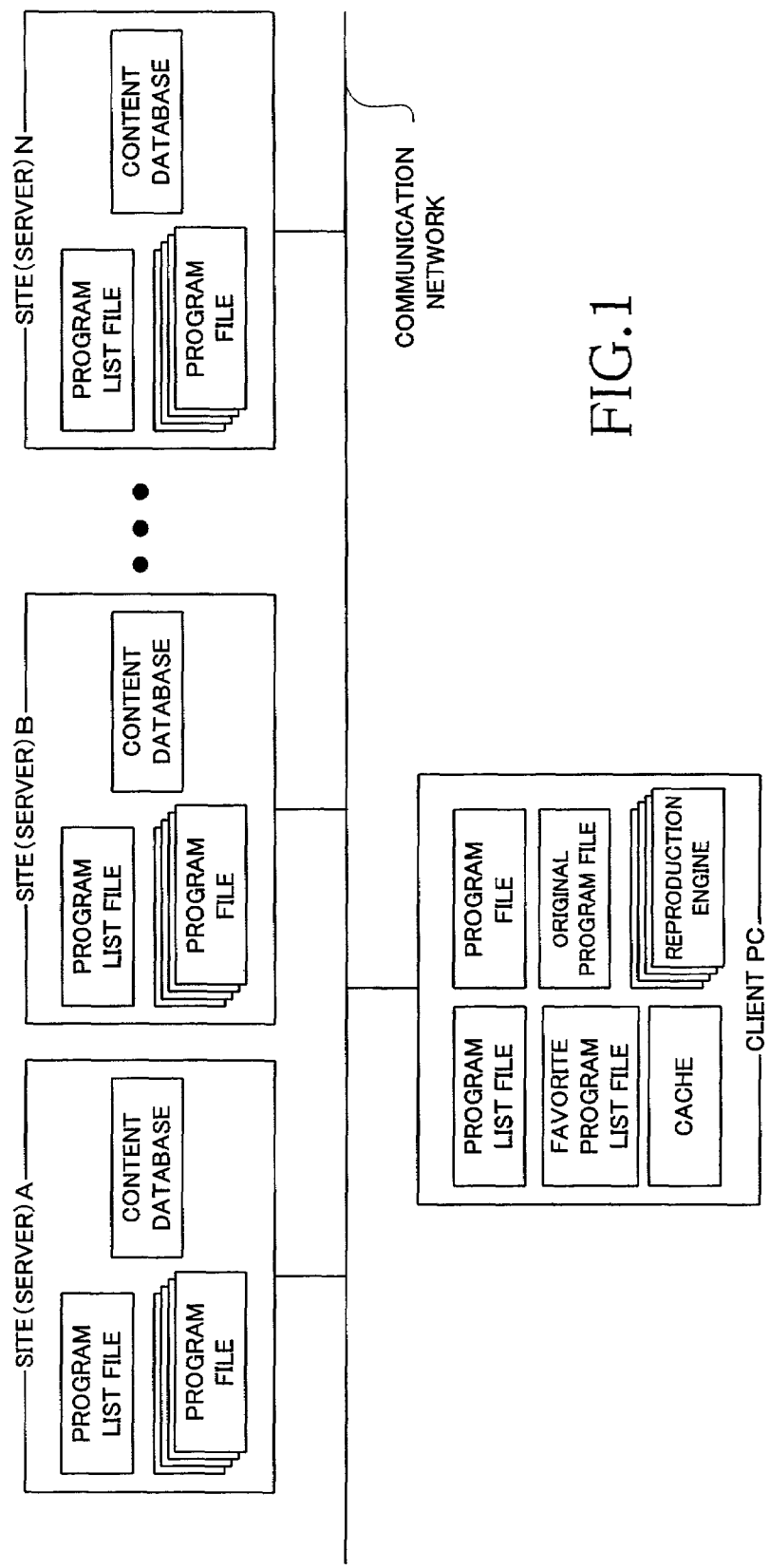
FIG. 1 is a block diagram showing a general hardware setup of a program reproduction system to which a first embodiment of the program creation/supply apparatus in accordance with the present invention is applied.

FIG. 1 is a block diagram showing a general hardware setup of the program reproduction system to which the first embodiment of the program creation/supply apparatus according to the present invention is applied. The program reproduction system of FIG. 1 includes a plurality of sites (i.e., program serving sites or servers) A–N, a client (i.e., client terminal or station) PC and a communication network X connecting the program serving sites (servers) A–N and client terminal or station PC. Each of the sites (servers) A–N and client or terminal station PC comprises a computer including a CPU, ROM, RAM, hard disk, modem, etc. (all not shown) and can independently transmit and receive data (e.g., content of an Internet-broadcast or other type of distributed program) via the communication network X. Namely, the client terminal PC is connectable any desired one of various communication networks X, such as a LAN (Local Area Network), Internet and telephone line network, for transmission/reception of various data to/from any one of the program serving sites or servers A–N. Although the program reproduction system of the present invention may include other hardware than the above-mentioned, it will be described hereinafter only in relation to a case where minimum necessary resources are employed. Note that the communication network X may be of the wireless type rather than the wire-connected type. Further, a plurality of clients (i.e., client terminals) PC may be connected to the communication network X.

In the preferred embodiment, each of the independent sites A–N may be constructed substantially similarly to a radio or television broadcasting station, and a great number of program files are prestored in a program storage section or area of each of the sites A–N. Each of the program files, which corresponds generally to a radio, television program, comprises a time-serial combination of various items of content such as MIDI files in the form of music piece data, audio files in the form of data relating to sounds or voices of the music piece or master of ceremonies (MC) and moving or still picture files in the form of video data, as will be later described in detail. The program content, such as the MIDI, audio, moving picture and still picture files (content files), is prestored in content databases (storage sections) of the individual program serving sites A–N, along with a multiplicity of other items of content to be used for other purposes than the program distribution. All the program files stored in the individual program serving sites A–N can be identified by means of a program list file.

The client terminal PC can select any one of the program serving sites A–N and then select any one of the program files for reproduction. More specifically, the client terminal PC first receives (obtains or acquires) a program list from the selected site A–N to store it in memory as a program list file. Then, the client terminal PC selects any one of the programs on the program list and obtains a corresponding program file from the selected site A–N to store it in memory. After that, the client terminal PC selects and obtains program content (files) from the selected site A–N and reproduces the obtained program content by means of a reproduction engine. The embodiment can use two reproduction modes, i.e., an "on-line reproduction mode" and an "off-line reproduction mode". In the "on-line reproduction mode", desired program content is obtained from the selected site A–N and reproduced on a real-time basis. In the "off-line reproduction mode", items of program content designated by the program file are obtained collectively and then reproduced after being temporarily stored in a cache memory. Further, as will be later described in detail, an interested user can register his or her favorite program in a favorite program file and also create his or her own original program. These pieces of information are stored into the client terminal PC as a favorite program list file and original program file. Note that the client terminal PC includes storage sections or storage areas provided in corresponding relation to the above-mentioned files.

Now, a brief description will be given about specific examples of the program list file and program file, with reference to FIGS. 2 and 3. Specifically, FIG. 2 is a conceptual diagram explanatory of an example of the program list file, while FIG. 3 is a conceptual diagram explanatory of an example of the program file.

Figures 2, 3, 4:
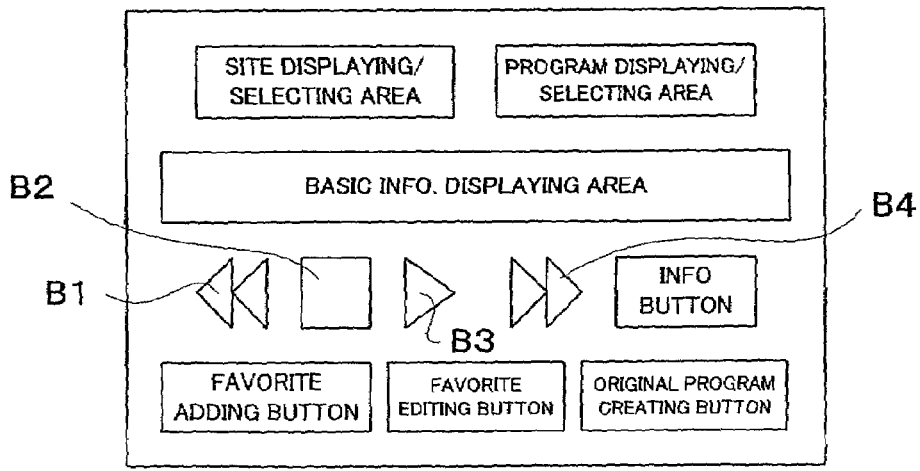
FIG. 2 is a conceptual diagram explanatory of an example of a program list file employed in the program reproduction system of FIG. 1.
FIG. 3 is a conceptual diagram explanatory of an example of a program file employed in the program reproduction system of FIG. 1.
FIG. 4 is a block diagram conceptually showing an example of an operation panel.

The program list file is a collection of data indicating a list of programs prestored in the individual program serving sites A–N and includes program names and URLs (Uniform Resource Locators) of program files, as shown in FIG. 2. Each of the program names represents a unique name or title assigned to one particular program, and each of the URLs of the program files represents a location in the site where one particular program file is stored and is uniquely assigned to the program file. For instance, each of the URLs is an address (e.g., Internet address) assigned to a particular program file stored in one of the sites on the communication network X so that access to the particular program file can be made from the client terminal PC and another one of the sites A–N.

In each of the program files, there is stored items of content information, such as MIDI, audio, moving picture and still picture files, in a predetermined sequence of the program progression or reproduction. For instance, in the case of a given program made up of an opening MC (audio file), first music piece (MIDI file), MC (audio file), second music piece (MIDI file), third music piece (moving picture file) and ending MC (audio file), respective items of content information are stored in the program file in the mentioned order of the files, as illustratively shown in FIG. 3. The program file is a collection of data indicating all the items of content information contained in one particular program, which includes content information consisting of a set of a "program name", "content URLs", "content IDs" and "basic content information". The program name is a unique name or title of one particular program similarly to the program name in the program list file. Each of the content URLs is information designating a location in which one particular program file is stored, each of the content IDs is information identifying one particular item of content, and each of the basic content information is descriptive of basic details of one particular program (such as a lyric writer, composer, player, etc. if the content concerns a music piece, or descriptive of a master of ceremonies if the program concerns an MC's speech. Further, the favorite program list file is constructed in a similar manner to the above-mentioned program list file, and the original program file is constructed in a similar manner to the above-mentioned program file.

Note that in the case where a music piece is stored as a moving picture file as with the third music piece in the program file of FIG. 3, video data of moving and/or still pictures, rather than the music piece data alone, are recorded (e.g., a promotion video).

The following paragraphs describe an operation panel that is used in the inventive program reproduction system and can be operated by a user to reproduce a desired program. FIG. 4 is a block diagram conceptually showing an example of the operation panel, which is provided on the client terminal PC so that a user can perform various operations such as ones for reproducing a desired program.

In a "site displaying/selecting area" of the operation panel of FIG. 4, a list of the program serving sites A–N is displayed so that the user can select any desired one of the displayed sites A–N. In a "program displaying/selecting area" of the operation panel, program names specified by a program list file stored in the selected site are displayed so that the interested user can select any desired one of the displayed programs. In a "basic information displaying area" of the operation panel, various basic information is displayed which pertains to an item of program content being currently reproduced (i.e., basic content information of a program file). Double-triangle button B1 pointing leftward is an REW button for fast-rewinding or fast-reversing currently reproduced content, and a double-triangle button B4 pointing rightward is an FF button for fast-forwarding currently reproduced content. Single-triangle button B3 pointing rightward is a playback button for reproducing desired items of content, and a square button B2 is a stop button for stopping reproduction of content being reproduced. INFO button is a button for displaying later-described information. Favorite adding button is a button for adding a currently reproduced program to the favorite program list file, and a favorite editing button is a button for displaying a favorite list editing screen (not shown) to allow the user to edit the favorite program list file. Original program editing button is a button for displaying an original program creating screen (not shown) to create/edit the original program file.

Although not specifically shown in FIG. 4, the operation panel also includes a picture display area for displaying moving and still pictures.

Figures 5, 8:
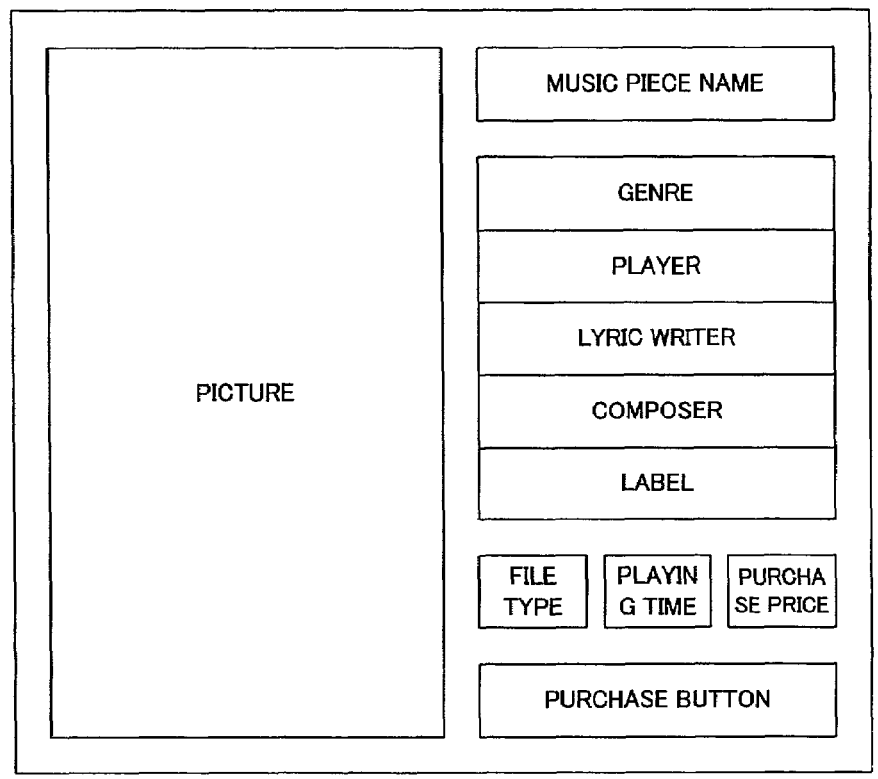
FIG. 5 is a conceptual diagram showing an example of an information display made in the program reproduction system.
FIG. 8 is a conceptual diagram showing an example of a program file which is arranged to allow a plurality of items of content to be reproduced concurrently in a parallel fashion.

In response to a user operation or activation of the INFO button, various information is displayed in a manner as shown in FIG. 5. In the described embodiment, information pertaining to a picture is displayed in the left half of the screen and information pertaining to program content is displayed in the right half of the screen. The information pertaining to program content includes music-piece-related information such as MIDI and audio files. More specifically, the name or title, genre, player, lyric writer, composer, label, file type, playing time, etc. of the music piece are displayed in response to the activation of the INFO button. Also displayed is a price at which the music piece (content) can be purchased. Each item of program content can be purchased on line by any interested user or audience by activating a "purchase button". Techniques relating to the online content purchase are well known and thus are not described here.

Figure 6A:
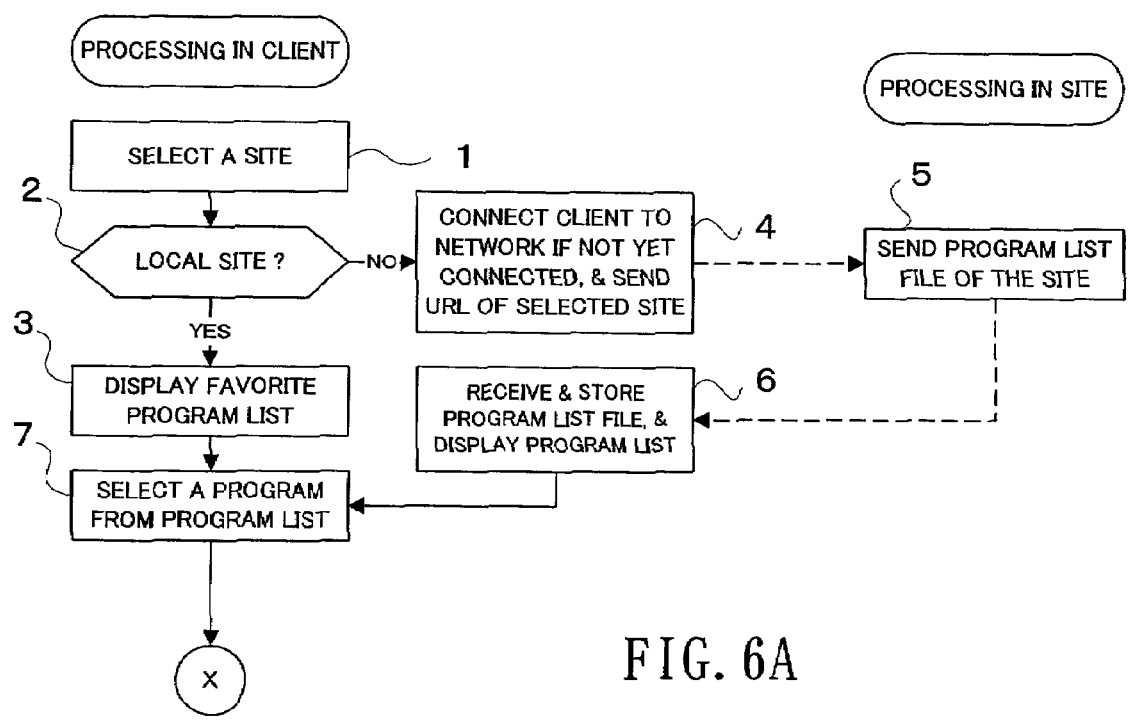
FIGS. 6A to 6C are flow charts showing an example of program creation/supply processing that is performed in the program reproduction system of the present invention.
Figure 6B:
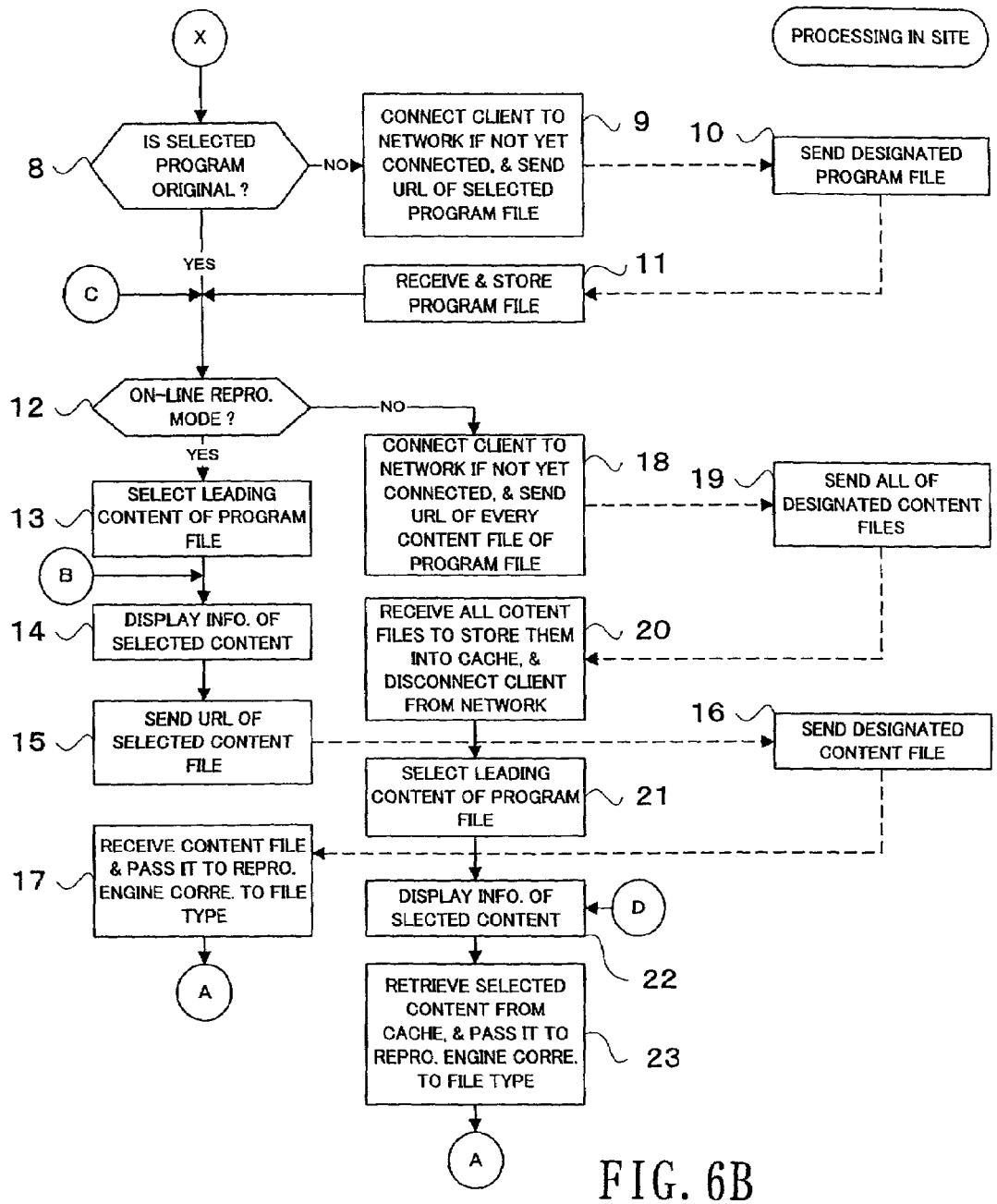
Figure 6C:
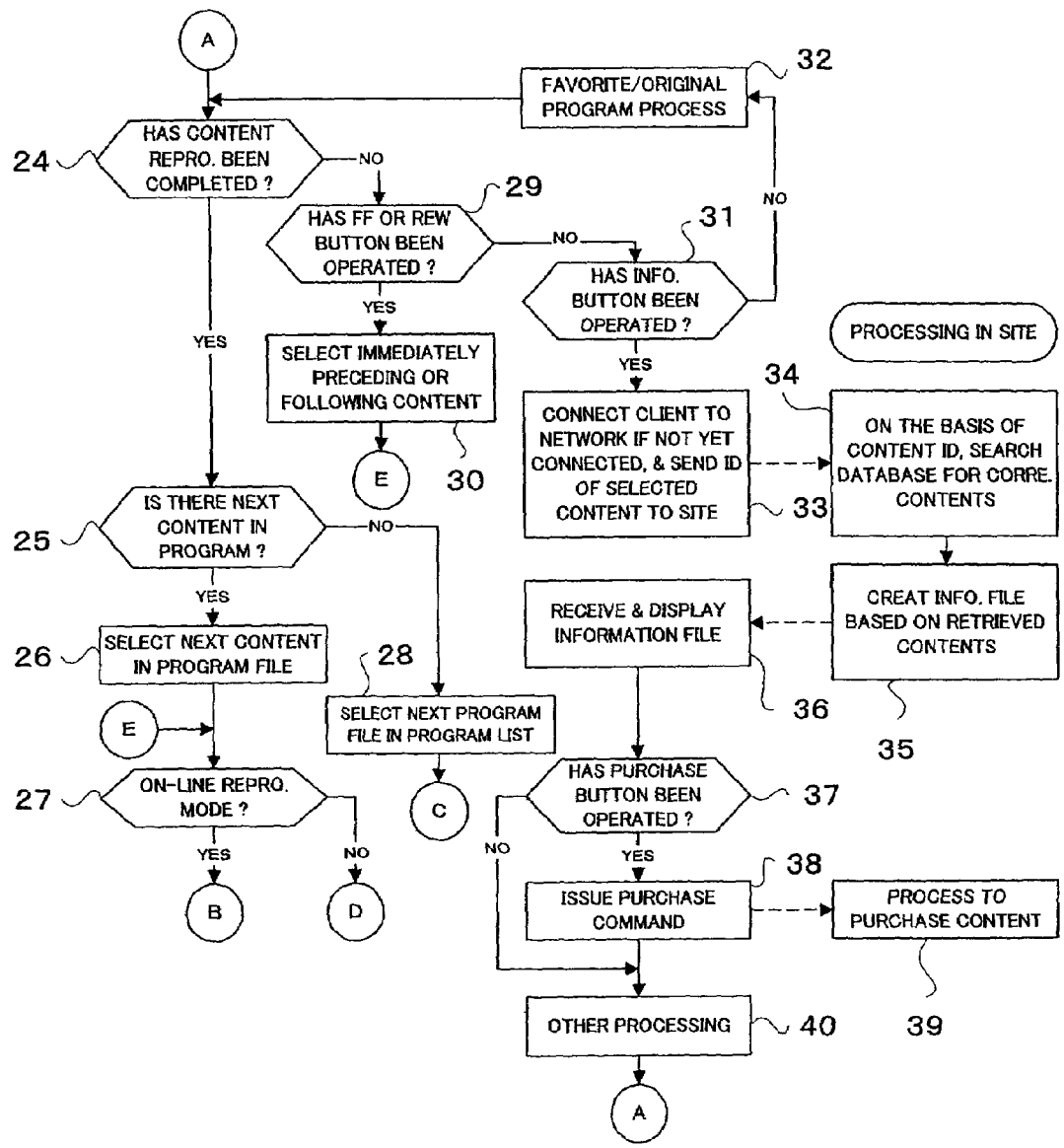

FIGS. 6A to 6C are flow charts showing an example of program reproduction processing that is performed in the program reproduction system of the present invention. Specifically, FIGS. 6A, 6B and 6C show former, intermediate and latter portions, respectively, of the program reproduction processing.

At step 1 of FIG. 6A, the user selects any one of the program serving sites displayed in the site displaying/selecting area on the operation panel (see FIG. 4) installed on the client terminal PC, in order to reproduce a desired program distributed from the selected site. The sites selectable here include not only the plurality of sites A–N on the communication network X but also a local site (namely, the client terminal PC). When the local site has been selected (YES determination at step 2), programs names registered in the favorite program list file are displayed, at step 3, in the program displaying/selecting area on the operation panel. When, on the other hand, one of the networked sites A–N has been selected (NO determination at step 2), the URL of the selected site A–N is sent onto the communication network X at step 4. If the client terminal PC is not yet connected to the communication network X at that time, then it is connected to the communication network X by a dial-up connection or the like. Assuming that the site A has been selected by the user of the client terminal PC at step 4, the selected site A sends its program list file to the client terminal PC at step 5. The client terminal PC receives the program list file from the selected site A and stores the list file into its program list storage section. Then, at step 6, the client terminal PC displays programs names contained in the stored program list file in the program displaying/selecting area on the operation panel. At next step 7, the interested user can select any one of the programs from the program name list.

Once any one of the programs has been selected by the user, a determination is made as to whether or not the selected program is a user's original program at step 8 of FIG. 6B. If the selected program is an original program (YES determination of step 8), the client terminal PC jumps to step 12 because the program file is already stored in the client terminal PC and thus there is no need to acquire any program file from the site A. If answered in the negative at step 8, i.e., if the selected program is not an original program, the client terminal PC sends the URL of the selected program file to the communication network X in order to acquire the program file from the site A at step 9. If, at that time, the client terminal PC is not connected to the communication network X (i.e., when the local site has been selected at step 2), then the client terminal PC is connected to the communication network X. Thus, the program serving site A sends the program file designated by the URL to the client terminal PC, at step 10. The client terminal PC receives the program file from the site A and stores it into its program file storage section at step 11. In this way, the interested user can select any desired one of a multiplicity of programs.

After that, program content is reproduced, in accordance with the selected original program file or acquired program file, in either the on-line reproduction mode or the off-line reproduction mode. The on-line reproduction mode is one selected by an user having his or her client terminal PC always connected to the communication network X, while the off-line reproduction mode is one selected by an user having his or her client terminal PC connected to the communication network X by a dial-up connection only when necessary. In the on-line reproduction mode, necessary content of a program are acquired one by one in real time from the program serving site A whenever the program content is to be reproduced. In the off-line reproduction mode, on the other hand, all items of content of a desired program to be reproduced are acquired collectively from the site A, so that the off-line reproduction mode can significantly reduce the length of the time period when the client terminal PC has to remain connected to the communication network X. By contrast, the on-line reproduction mode can reduce the waiting or latency time before the content reproduction is initiated and thereby greatly enhance the real-time reproducibility due to the fact that each necessary item of program content is acquired in real time.

When the program reproduction system is in the on-line reproduction mode as determined at step 12, the reproduction system behaves as follows. In this case, the client terminal PC automatically selects first or leading content information within the program file, at step 13. Then, at step 14, the client terminal PC displays basic content information in the basic information displaying area on the operation panel. Although various other information is received or acquired from the program serving site A and then visually displayed, this basic content information is already stored in the program file and hence need not be acquired from the site A each time it is to be displayed, so that the network traffic can be effectively alleviated. After the display, the URL of the selected content information is sent out to the site A at step 15, in response to which the site A sends the corresponding content file at step 16. Then, at step 17, the client terminal PC receives the content file from the site A and passes it to one of reproduction engines (i.e., dedicated hardware devices or software programs for performing a necessary reproduction process) which corresponds to the type of the file, such as the MIDI, audio, moving picture or still picture, to start the content reproduction.

When the program reproduction system is in the off-line reproduction mode (NO determination at step 12), the system behaves as follows. First, the URL of every content information within the program file is sent from the client terminal PC to the program serving site A, which in turn sends all of the thus-designated content files to the client terminal PC at step 19. Here, the order in which the content URLs are sent from the client terminal PC and the content files are sent from the site A need not necessarily agree with an actual reproducing sequence of the items of content in the program. If the client terminal PC is not connected to the communication network X at that time, the client terminal PC is connected to the communication network X. The client terminal PC receives all the content files from the site A and then is disconnected from the communication network X. The received content files are stored into a cache memory at step 20. Then, the client terminal PC selects first or leading content information within the program file at step 21, displays the basic content information at step 22, and passes each of the content files to one of the reproduction engines which corresponds to the type of the file, such as the MIDI, audio, moving picture or still picture, to start the content reproduction at step 23.

Whereas the client terminal PC in the preferred embodiment has been described as collectively receiving all items of content of a program in the off-line reproduction mode, the present invention is not so limited, and the client terminal PC may collectively receive all items of content of all programs or only designated ones of the programs present in the selected site, in which case the user is allowed to reproduce a plurality of programs in succession by being connected to the communication network only once. Further, although the client terminal PC in the preferred embodiment has been described as reproducing content after having downloaded content files to be reproduced, the client terminal PC may reproduce the content immediately as the content files are delivered on a streaming basis.

Once the content reproduction has been initiated at steps 17 and 23, the client terminal PC proceeds to step 24 of FIG. 6C, where a determination is made as to whether the content reproduction has been completed or not. If the content reproduction has been completed (YES determination at step 24), it is further determined at next step 25 whether there is next or other content information in the program file. If answered in the affirmative at step 25, that content information is selected at step 26. Then, if the on-line reproduction mode is on (YES determination at step 27), the client terminal PC reverts to step 14, but if the off-line reproduction mode is on (NO determination at step 27), the client terminal PC reverts to step 22. If there is not next or other content information in the program file (NO determination at step 25), a next program file within the program list file is selected at step 28, and the client terminal PC reverts to step 12. In this way, a plurality of programs can be reproduced one after another. Note that if there is not a next program file within the program list file as determined at step 28, this means that reproduction of all the items of content in the program has been completed, and thus the program reproduction processing of FIGS. 6A to 6C may be terminated or the leading program file in the program list may be again selected.

At step 29 of FIG. 6C, a determination is made as to whether the fast-forwarding (FF) button or fast-rewinding (REW) button has been operated or activated during the content reproduction. If the fast-forwarding (FF) button has been activated as determined at step 29, the client terminal PC, at step 30, selects other content information immediately following the content being currently reproduced within the program file, or if the fast-rewinding (REW) button has been activated, the client terminal PC, at step 30, selects other content information immediately preceding the currently reproduced content. After step 30, the client terminal PC reverts to step 27. This way, the user is allowed to skip a non-favorite music piece or listen to a currently-reproduced music piece more than once unlike with an ordinary radio or television program.

When the INFO button has been activated as determined at step 31, the client terminal PC sends the content ID of the selected program file to the program serving site A at step 33. If the client terminal PC is not connected to the communication network X at that time, the client terminal PC is connected to the communication network X. Upon receipt of the content ID from the client terminal PC, the site A, at step 34, searches through the content database for content files corresponding to the content ID. For instance, if the content ID of a MIDI music piece has been received, the site A searches for audio content, still picture content (e.g., a photograph on a CD jacket), miscellaneous information content (e.g., name, genre, player, lyric writer, composer, label, playing time length, purchase price, etc. of the music piece), music score content and the like. Then, the site A creates an information file on the basis of the searched content files and sends the thus-created information file to the client terminal PC at step 35. The client terminal PC receives the information file from the site A and visually displays it at step 36.

As noted earlier, the purchase button is displayed on an information displaying screen of FIG. 5. By activating the purchase button to purchase a desired items of content such as a MIDI music piece file (YES determination at step 37), the user is allowed to purchase the desired items of content and other content related to the desired items of content such as an audio content file and music score content file. For that purpose, the client terminal PC sends a purchase command and the content ID of the desired items of content to the site A at step 38, in response to which the site A, at step 39, carries out a process pertaining to the requested purchase of the desired items of content and other content related to the desired items of content. Note that the content acquired for reproduction within the program and the content purchased here may be in the following relationship. For example, the content acquired for reproduction within the program may be those covering just a part of a music piece or low-quality sample content, while the content purchased here may be those covering the whole of the music piece or high-quality content. Then, at step 40, other processing is carried out irrespective of whether the purchase button has been activated or not. The other processing of step 40 includes various operations pertaining to information to be displayed in response to a user selection (mouse-clicking) on the information displaying screen; for example, when the item "player" has been selected, step 40 searches for and displays content pertaining to the player. After completion of the other processing, the client terminal revers to step 24.

The above-mentioned information-displaying and content purchasing operations are carried out in the same manner for both the program supplied from the site A and the favorite or original program stored locally. Further, these information-displaying and content purchasing operations are carried out even with the FF or REW button activated. Thus, any interested user can acquire information and content of any desired music piece at any desired time.

When the user has activated the favorite adding button, favorite editing button or original program creating button without activating the INFO button as determined at step 31, a favorite/original program process is performed at step 32.

Figure 7:
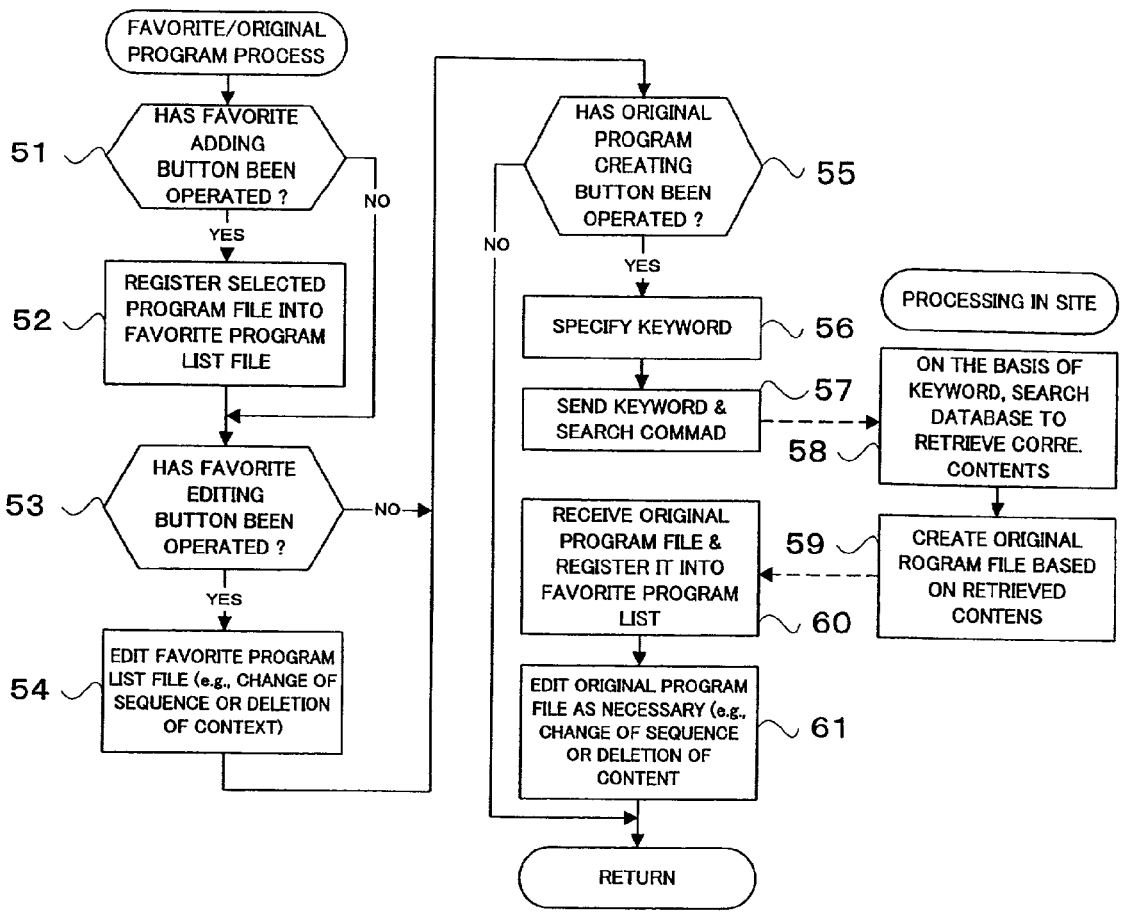
FIG. 7 is a flow chart showing an example of a favorite/original program process performed in the program reproduction system.

FIG. 7 is a flow chart showing an example of the favorite/original program process. When the favorite adding button has been activated as determined at step 51, a currently-selected program file is registered into the favorite program list file at step 52; that is, the program name and URL of the selected program file are additionally registered. When the favorite editing button has been activated and thus an YES determination has been made at step 53, the favorite program list file is edited at step 54; for example, at this step 54, the sequence of the programs in the favorite program list is changed, or a selected one or more of the programs is deleted. The editing of the favorite program list file is carried out by visually showing an editing screen (not shown) on the display to permit desired editing operations by the user utilizing the screen.

Further, when the original program creating button has been activated and thus an YES determination has been made at step 55, the client terminal PC goes to step 56, where are specified one or more keywords pertaining to content to be stored as an original program. For example, the player's name, musical genre, etc. may be designated as the keywords. Then, at step 57, the client terminal PC sends the specified keywords and a search command to the site A. On the basis of the keywords, the site A searches through the content database corresponding items of content and lists up the corresponding items of content at step 58. Then, at step 59, the program serving site A creates an original program file based on the listed items of content and sends the thus-created original program file to the client terminal PC. Similarly to ordinary program files, the original program file includes content URLs, content IDs and basic content information; note that the content in the original program file are arranged in a predetermined order, such as English or Japanese alphabetical order or order in which they have been found. Then, the client terminal PC receives the original program file from the site A and registers it into the favorite program list at step 60. Then, the user can edit the original program file as necessary at step 61; for example, the user changes the sequence of the items of content or deletes a selected one or more of the items of content. If a new original program is created in the site A, then the old original program file stored in the client terminal PC may be discarded, or only new content may be added to the existing original program file. Alternatively, a plurality of such original program files may be stored.

Although the processing of FIG. 7 has been described to create an original program file by arranging, in a predetermined order, items of content listed through a search by the site A, only desired ones of the listed items of content may be designated by the client terminal PC so that the site A can create an original program file of the client-designated content alone. Further, the program editing function may be possessed by the site A rather than the client terminal PC; in such a case, an editing command is issued from the client terminal PC, on the basis of which the site A performs editing to change the sequence of the items of content and/or delete a selected one or more of the items of content.

Although not specifically shown in the above-described processing flows of FIGS. 6A–6C and 7, reproduction of any item of content can be stopped compulsorily by activating the stop button of FIG. 4 and can be resumed by again operating the stop button. Further, arrangements may be made to optionally terminate the above-described operations by the user giving an instruction.

In the above-described program reproduction system, each program is caused to progress by reproducing items of content sequentially one after another. Namely, because of the sequential or successive arrangement of items of content in a program (program file), these items of content can not be reproduced concurrently in a parallel fashion. However, the present invention is not so limited, and programs (program files) may be constructed in such a manner that a plurality of items of content can be reproduced concurrently in a parallel fashion. Such an arrangement permits program making which can reproduce a MIDI music piece at the same time an audio MC speech file is reproduced, or reproduce a MIDI music piece while switching one still picture to another as a background picture.

FIG. 8 is a diagram showing an example of a program file which is arranged to allow a plurality of items of content to be reproduced concurrently in a parallel fashion. As shown, each program consists of a plurality of tracks which correspond to various different types of content files such as MIDI, audio, moving picture and still picture files. Namely, in this example, two or more types of content files are not stored mixedly in a single track, and the individual items of content can be read out from the plurality of tracks in a parallel fashion (without ovelapping each other) and passed to respective dedicated reproduction engines for reproduction purposes. That is, the reproduction engines also operate in parallel in corresponding relation to the content types. Process for reproducing data of a plurality of tracks in parallel is well known in the field of automatic performance and will not be described here. Note that reproduction timing of successive items of content in a single track is set to not overlap each other. After readout of such a program file, the program file is subjected to the same operations as described above.

The plurality of tracks may be implemented by dividing a same storage area as shown in FIG. 8 (i.e., storing each type of content in a different divided track), or by imparting track identifying data to each item of content instead of diving the storage area (i.e., storing various items of content mixedly in the tracks with track identifying data).

In reproducing a plurality of items of content concurrently, it is desirable to impart a fade-in/fade-out effect or the like. For impartment of such a fade-in/fade-out effect, fading-in and fading-out content items may be prestored, or a command to impart fade-in and fade-out may be embedded in a program along with fade-in/fade-out timing information so that the fade-in and fade-out is effected upon readout of such a command. Where the content concerns a music piece or MC speech, a command to impart an acoustic effect, such as a reverberation effect, may be embedded in addition to the fade-in/fade-out command. Further, where the content concerns a still or moving picture, there may be embedded a command to impart a video effect such as a mosaic or wipe effect. These effect may be imparted during reproduction of the content rather than at the start or end timing of the content reproduction.

Figure 9A:
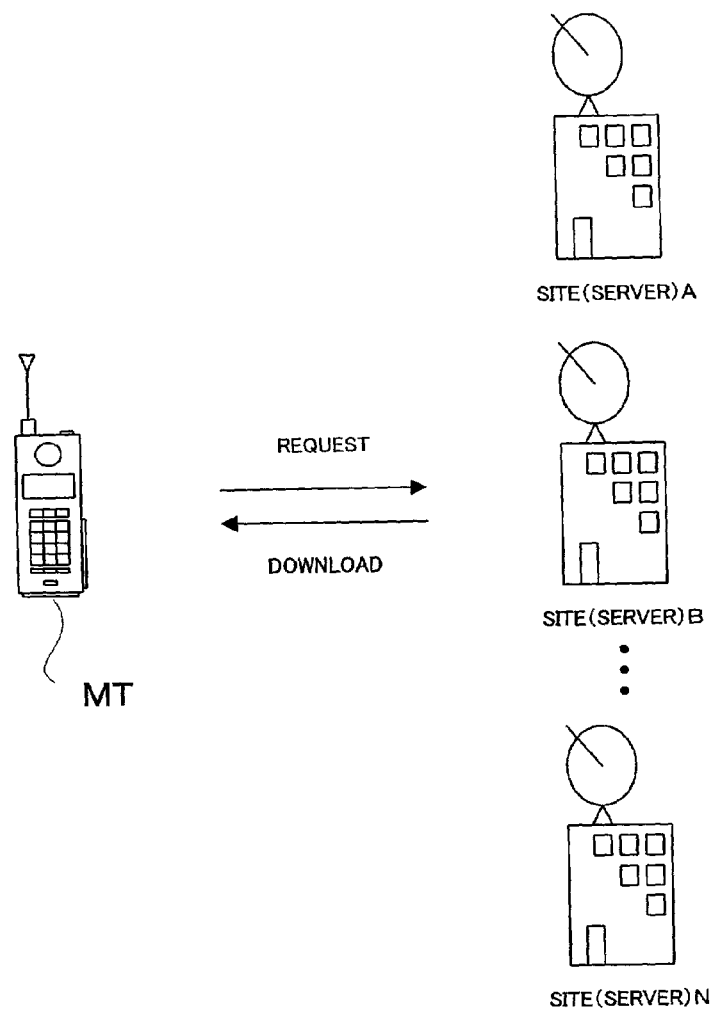
FIG. 9A is a diagram showing an example where a client terminal is a portable-type communication terminal.
Figure 9B:
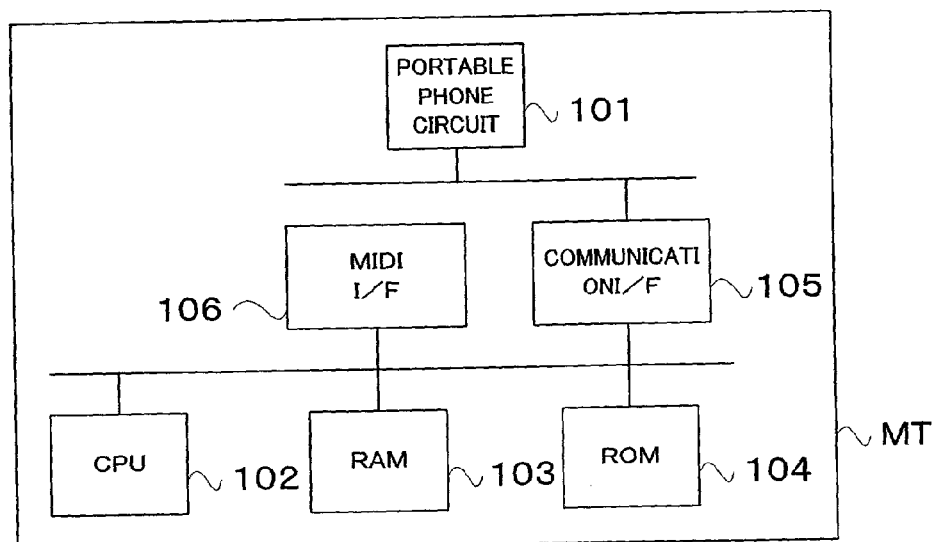
FIG. 9B is a block diagram showing an exemplary inner structure of the portable-type communication terminal having a tone generating function.

FIG. 9A is a diagram showing an example where the client terminal PC is a portable-type communication terminal MT, such as a cellular phone, PHS (Personal Handy Phone System in Japan) phone or other mobile terminal equipment. Assume here that the portable-type communication terminal MT has a tone generating function such as a conventional tone generator or sequencer function. FIG. 9B is a block diagram showing an exemplary inner structure of the portable-type communication terminal MT having such a tone generating function. The portable-type communication terminal MT includes a conventional portable phone circuit 101, and a microcomputer installed therein and including a CPU 102, a RAM 103 and a ROM 104. The portable phone circuit 101 and microcomputer communicate with each other via a communication interface 105. The portable phone circuit 101 has an Internet function and a simplified Internet function. By establishing a radio communication connection between the terminal MT and any of the program serving sites A–N, information communication between the internal microcomputer and the site A–N is permitted via the communication interface 105. Program and data necessary for implementing the tone generating function are stored in the ROM 104 along with a program reproducing computer program (application software) of the present invention. In this case, the ROM 104 may comprise a rewritable memory, such as a flash ROM so that the tone generating program, data and/or program reproducing computer program of the present invention can be updated whenever necessary.

Let's assume here that various switches associated with the portable phone circuit 101 are used to perform functions of various input buttons of the communication terminal MT. In this case, information representing user's switch operation generated by the portable phone circuit 101 is received by the above-mentioned internal microcomputer via the internal communication interface 105, and the above-described various operations are carried out in accordance with input operation signals generated via the microcomputer. Further, various data, such as items of content received from any of the program serving sites A–N, are received from the portable phone circuit 101 and passed via the communication interface 105 to the internal microcomputer for storage into the RAM 103. The thus-received content and other data are passed via the interface 105 to the portable phone circuit 101 to be visually shown on a display associated with the phone circuit 101. Further, the received content and other data, or content and other data generated by the internal microcomputer can be delivered via the communication interface 105 to the portable phone circuit 101, from which they can be transmitted via a radio telephone line to another portable-type communication terminal MT or personal computer (e.g., by being attached to an e-mail) as desired. In addition, the content generated by the internal microcomputer can be passed via the communication interface 105 to the portable phone circuit 101 so that they are audibly sounded through an internal speaker or visually shown on the display. The portable-type communication terminal MT may further include a MIDI interface 106 for exchange of MIDI performance data with the outside. Furthermore, any desired one of MIDI, audio, moving picture and still picture files received from any one of the program serving sites (servers) A–N may be stored into an appropriate storage so that it can be used as incoming-call informing melody or picture data or melody to be sounded during a call-holding period. Moreover, any one of the received MIDI, audio, moving picture and still picture files may be used as background music or visual image during a telephone call.

Also note that when some content is purchased by the user, the purchase price of the content may be added to the user's charge for using the communication terminal MT, or may be billed to the user separately from the charge for using the communication terminal MT. In the case where the portable-type communication terminal MT is used as the client terminal PC like this, it may be equipped with only some, rather than all, of the above-mentioned functions.

Whereas the fast-forwarding (FF) or fast-rewinding (REW) button has been described as selecting other content immediately preceding or following currently-reproduced content, it may be used to move the reproduction forward or backward by an amount corresponding to a predetermined time. Further, when given content immediately preceding or following currently-reproduced content is to be selected for a type of program whose content information of a plurality of tracks is reproduced concurrently, arrangements may be made for the user to decide a particular one of the tracks for which to move the reproduction forward or backward by one item of content or to fixedly preset such a particular one of the tracks for which to move the reproduction forward or backward. Furthermore, it is not always necessary for the inventive program reproduction system to possess both of the functions to fast-forward or fast-rewind the content, and only either one of the functions may be possessed. Moreover, the inventive system may be arranged to be able to fast-forward or fast-rewind during a temporary stop of the content reproduction instead of being able to fast-forward or fast-rewind during the content reproduction.

Display of various and instruction for purchasing a desired item of content may be performed using a Web browser. Namely, a Web browser process may be activated separately from the above-described client terminal processing so that the information display and content purchase instruction can be made in the Web browser process. Besides, the information display and content purchase instruction may be enabled during a temporary stop of the content reproduction rather than during the course of the content reproduction.

Program files, content files and various other data may be supplied from an external storage medium to the inventive program reproduction system, or may be supplied from an external device via a communication interface to the sites and/or client terminal.

Content information, such as program files, may be stored time-serially in successive storage areas, or content information stored in disbursed storage areas may be managed as a time-serial succession of data. Namely, it does not matter whether or not the content information is stored in successive storage areas, as long as it can be managed as a time-serial succession of data.

Moreover, the above-mentioned functions of the present invention may be implemented by use of resources (such as a not-shown CPU, RAM an ROM) within the portable phone circuit 101, rather than by the internal microcomputer provided separately from the portable phone circuit 101.

Furthermore, the music files employed in connection with the present invention need not necessarily be in the MIDI format and may be prepared by encoding music performance information using some encoding scheme. The audio files need not be in the PCM format and may be in any other suitable compressed data format such as ADPCM or DPCM. Similarly, the moving picture and still picture files may be in a suitable compressed data format.

The following paragraphs describe a second embodiment of the program creation/supply apparatus of the invention, with reference to FIGS. 10–17.

Figure 10:
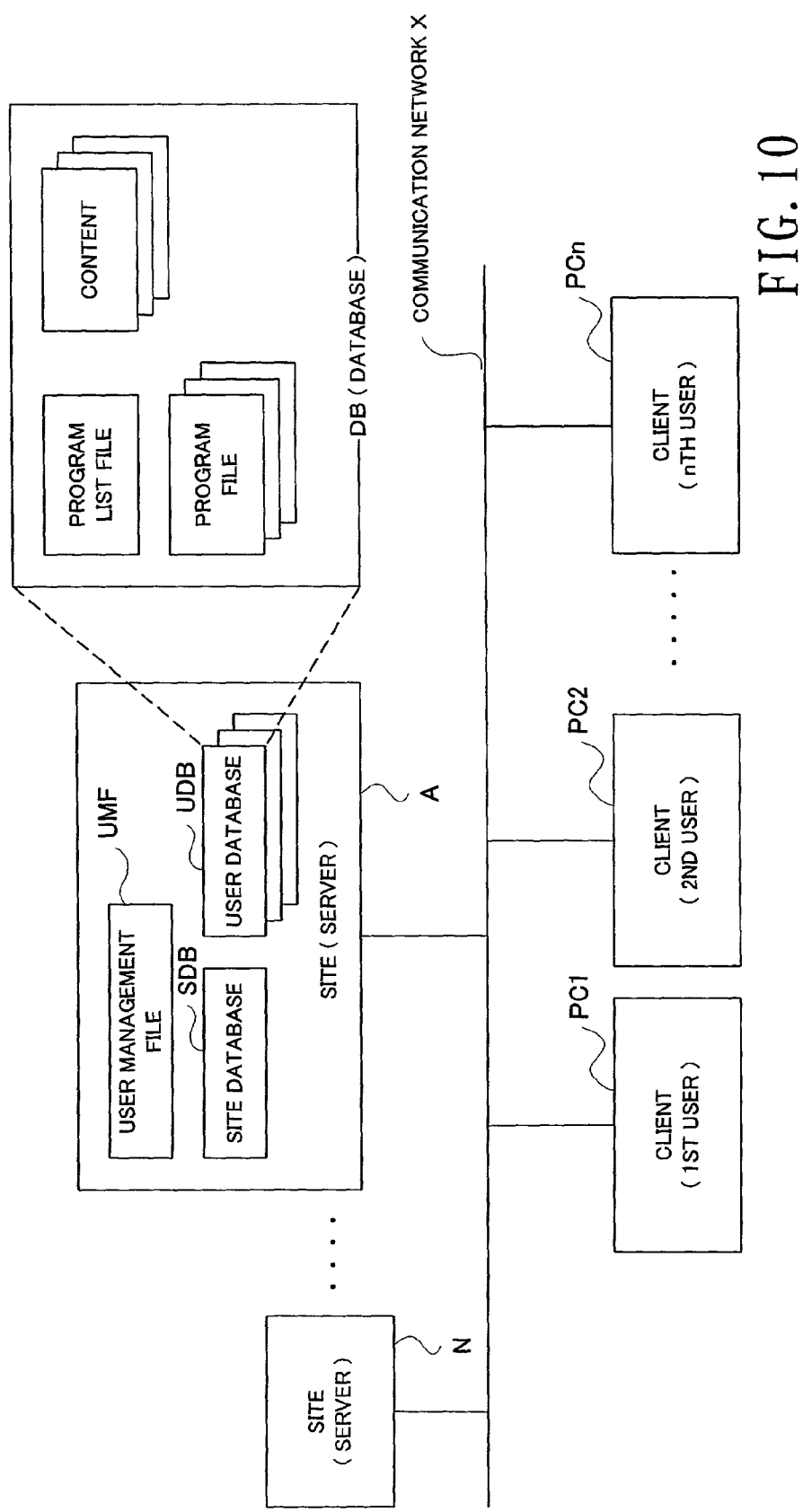
FIG. 10 is a block diagram showing a general hardware setup of an embodiment of a program reproduction system to which a second embodiment of the program creation/supply apparatus is applied.

FIG. 10 is a block diagram showing a general hardware setup of an embodiment of a program reproduction system to which the second embodiment of the program creation/supply apparatus is applied. As shown, this program reproduction system includes a plurality of sites (servers) A–N (only one of the sites, i.e. site A, is shown representatively in the figure), a plurality of client terminals or apparatus PC1–PCn, and a communication network X. Each of these sites A–N and client terminals PC1–PCn comprises a computer including a CPU, a ROM, a RAM, a hard disk, a modem, etc. (all not shown), and is capable of independently transmitting and receiving data, such as an original program file or content created by a user, via the communication network X such as a LAN (Local Area Network), the Internet, telephone line network. Namely, the general hardware setup of the program reproduction system shown in FIG. 10 is similar to that of the program reproduction system of FIG. 1, and the user is allowed to access any desired one of the sites A–N, using the client terminal PC1–PCn, via the communication network X so as to communicate various data etc. between the client terminal PC1–PCn and the desired site A–N. Of course, such communication of various data etc. may be carried out by accessing any one of the sites A–N using a portable communication terminal MT as shown in FIG. 9A.

In each of the sites A–N, there are stored a user management file UMF, a site database SDB and a plurality of user databases UDB. The user management file UMF is a file containing a plurality of pieces of user identification information for identifying individual users, such as names, passwords, addresses, etc. of the individual users. The user management file UMF is used to identify each user having accessed the site in question and then determine whether the identified user is one already authorized to access that site. If the identified user is one already authorized to access that site, then the user can additionally register desired data in the user database UDB provided in the site or change data already registered in the user database UDB.

Further, the site database SDB provided in each of the sites A–N is a database prestoring various information, such as a site program list file, a plurality of site program files and a plurality of items of site content. Further, the user databases UDB are provided in each of the sites A–N in corresponding relation to the users; that is, the user database UDB is a user-specific database storing user content created by the corresponding user, user program files and user program list file created in the site A–N in accordance with instructions of the corresponding user. The user database UDB is allocated to the user when the user accesses the site A–N for the first time (e.g., when the user has been registered in the site). In other words, each of the site database SDB and user databases UDB stores program list files, program files, content, etc. managed by the owner of the database. Namely, the site database SDB is a database where stored data can be managed by the owner of the site, while the user database UDB is a database where stored data can be managed only by the user registered in the site A–N. Detailed contents of the individual information (i.e., program list files, program files and content) will not be described here because they have been described earlier in relation to FIG. 1. However, it should be noted that the program files or content in the instant embodiment are associated with utilization management information for the owner of the site to manage these data; for example, the utilization management information may comprise access right information, such as a "read-only right" allowing the user to only read or refer to the data and a "read/write right" allowing the user to not only refer to the data but also make a change or addition to the data.

Each of the plurality of client terminals PC1–PCn is a terminal, such as a personal computer, cellular telephone or other type of portable terminal, which is equipped with a communication function for using the above-mentioned pieces of information provided in the individual sites A–N. Each of the client terminals PC1–PCn is capable of accessing any desired one of the sites A–N to reproduce a program file stored in the desired site, create a new program file in the site, upload content, stored in the client terminal, to the desired site, or obtain a program file from the site to use the obtained program file. That is, each of the client terminals PC1–PCn stores each item of content created by the client terminal, each item of content and program file obtained from a source outside the client terminal such as any one of the sites A–N or external storage medium, each program reproducing computer program for reproducing the content and program file, etc.

The instant second embodiment is arranged to register a program prepared by a user combining a plurality of desired items of content, so that an original program, having an intention of the user precisely reflected therein, can be delivered to another user (i.e., any one of the other client terminal). The following paragraphs describe, with reference to FIG. 11, a user program creation process which allows a user to create and register an original user program file in any desired one of the sites A–N by selecting or designating one or more desired items of content using a predetermined one of the client terminals PC1–PCn. Note that the following description will be made in relation to a case where a user program file is created and registered in the site A on the basis of content designation by the client terminal PC1.

Figure 11:
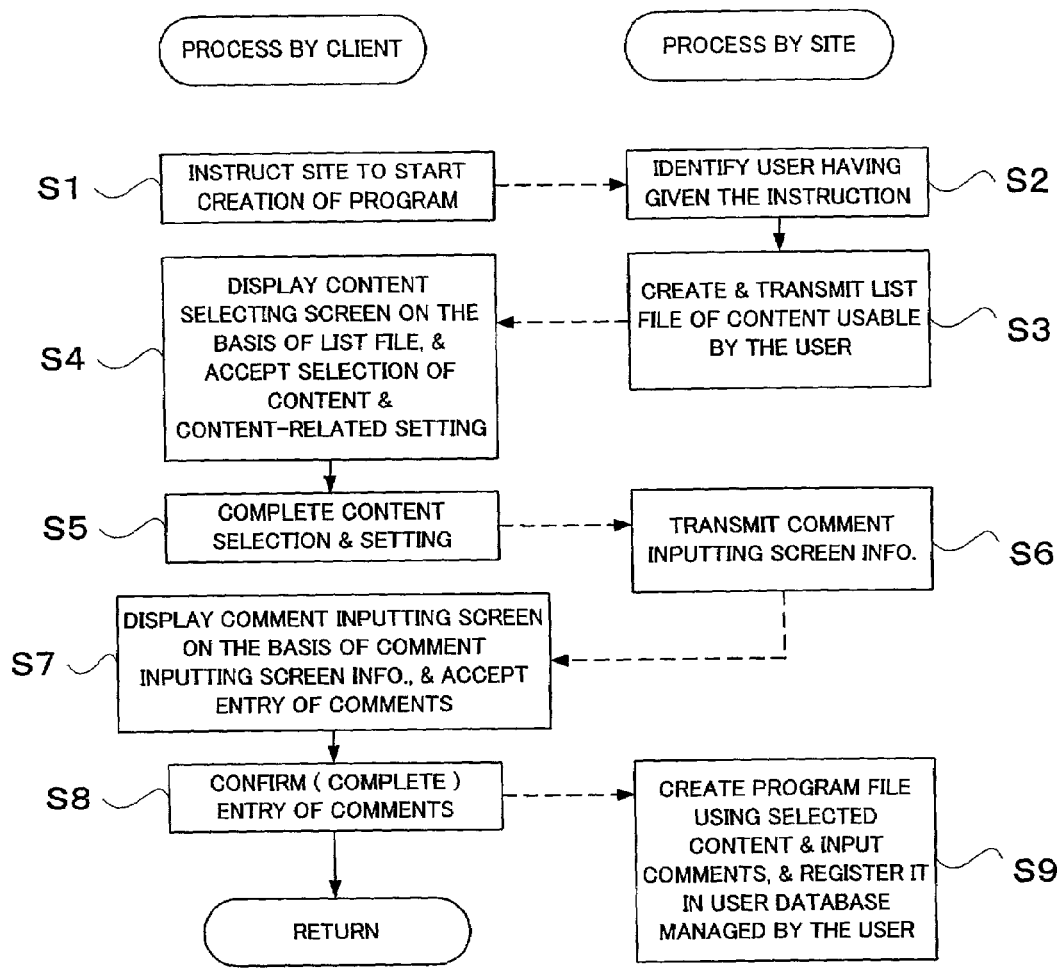
FIG. 11 is a flow chart showing an exemplary step sequence of a user program creation process carried out in the program reproduction system shown in FIG. 10.

FIG. 11 is a flow chart showing an exemplary step sequence of the user program creation process, which is started up or triggered by activation of the "original program creating button" (FIG. 4) on the above-mentioned operation panel and constitutes another example of a set of operations following step 56 of the favorite/original program process of FIG. 7.

First, at step S1, the user uses the client terminal PC1 to instruct (request) the desired site A to start creation of an original program. The site A, having been instructed to create an original program, identifies the user having given the instruction, at step S2. The site A identifies the user by reference to the user management file UMF stored therein, on the basis of the address of the client terminal PC1 used by the user in accessing the site A (at the time of requesting the program creation start) or the user's name and password entered via the client terminal PC1. Once the user has been identified accurately in this manner, the site A creates information (hereinafter called a list file) listing items of content usable by (or available to) the user to create a user program file and then sends the list file to the client terminal PC1, at step S3. Among the items of content usable by the user for user program file creation, i.e. items of content included in the list file, are, for example, those previously stored in the site database SDB of the site A, those registered by the user in the user database UDB of the user, and those created by another user which the user in question is authorized to access (i.e., items of content stored in the user database UDB of the other user). At step S4, the client terminal PC1 visually displays a content selecting screen (to be described later) on the basis of the list file received from the site A and then accepts selection, by the user, of one or more items and various content-related setting. Here, only items of content usable by the user are displayed on the content selecting screen.

Figure 12:
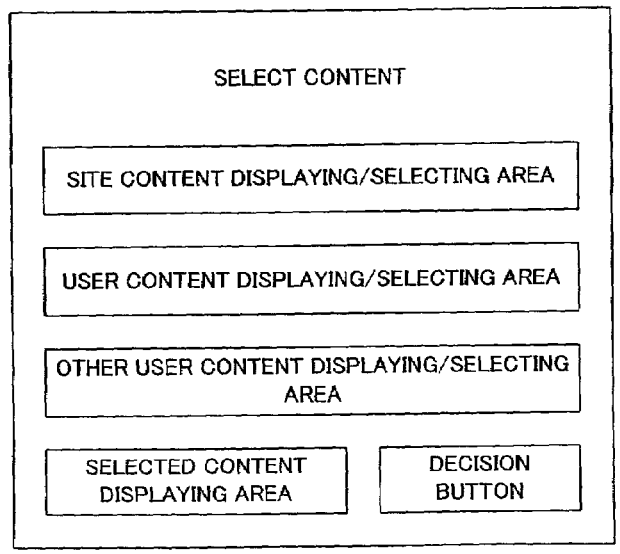
FIG. 12 is a diagram schematically showing an example of a content selecting screen.

Here, a brief description is made about the content selecting screen, with reference to FIG. 12 schematically showing an example of the content selecting screen. The content selecting screen is displayed on the basis of the list file received from the site A. As shown in FIG. 12, the content selecting screen has a site content displaying/selecting area, a user content displaying/selecting area, an other user content displaying/selecting area, a selected content displaying/selecting area, and a decision button. The site content displaying/selecting area displays a listing of only items of content, from among a set of the items of content included in the received list file, previously stored in the site database DB of the site A. The user content displaying/selecting area displays a listing of only items of content, from among the set of the items of content included in the received list file, registered by the user in the site A (i.e., user content). The other user content displaying/selecting area displays a listing of only items of other user's content from among the set of the items of content included in the received list file. Any of these items of content can be selectively designated as content to be used in creation of the user program file. The selected content displaying/selecting area displays only content selected from among the content displayed in each of the displaying/selecting areas. For example, when the user clicks, using the mouse, on a desired item of content from among all the items of content currently displayed on the above-mentioned displaying/selecting areas, only the clicked-on item of content is displayed on the selected content displaying area. Repeating such selecting operations can select a plurality of items of content, and the thus-selected items of content are displayed on the selected content displaying area in the order of the selection (i.e., order of reproduction). Further, with the selected content displaying area, it is also possible to set desired reproducing order of designated items of content and/or respective reproducing time lengths of the individual items of content, by performing predetermined operation on the displayed items of content. Once the "decision button" is activated after completion of all the necessary content selection and setting operations, information indicating the completion of the content selection and setting operations and the selected and set content is transmitted to the site (step S5 of FIG. 11 to be described later), and the process goes to a next operation.

Referring back to FIG. 11, once the content selection and setting operations have been completed at step S5, the server A transmits, to the client terminal PC1, comment inputting screen information for the user to input desired comments, at step S6. Namely, the site A creates information representative of a screen (comment inputting screen) prompting the user to enter desired comments with respect to the individual selected items of content and then transmits the thus-created information to the client terminal PC1. Then, the client terminal PC1 displays the comment inputting screen (to be later described) on the basis of the comment inputting screen information from the site A and accepts comments entered by the user, at step S7. When the entry of the user's desired comments is confirmed (completed) at step S8, the site A creates a program file on the basis of the designated content and inputted comments and registers the thus-created program file in the user database UDB managed by the user, at step S9. Namely, the site A creates a user program file as illustratively shown in FIG. 3 on the basis of the information of the selected content and setting received from client terminal PC1. However, unlike the case of FIG. 3, the comments inputted in correspondence with the individual items of content are added as additional information to the program file. Note that any other information than the inputted comments may be added as the additional information. The thus-created user program file is registered (i.e., stored) into the user database UDB of the user and information related to that program is added to the user program list file.

By so doing, the user can create a new original program having precisely reflected therein the intention of the user and make public the created new original program on the site A.

Figure 13:
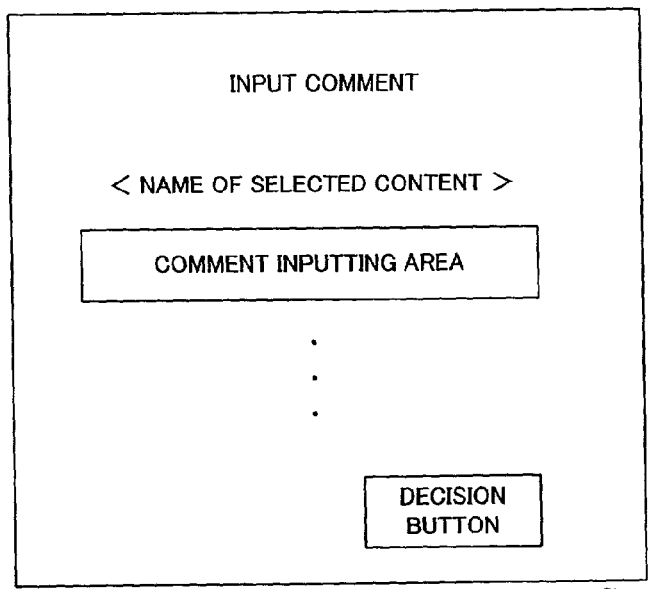
FIG. 13 is a diagram schematically showing an example of a comment inputting screen.

The following paragraph describes the comment inputting screen, with reference to FIG. 13 showing an example of the comment inputting screen.

The comment inputting screen is displayed on the basis of the comment inputting screen information received from the site A. On the comment inputting screen, as shown in FIG. 13, a "selected content name" area showing each user-selected item of content and a "comment input area" for inputting a comment to be attached to the item of content are displayed in the reproducing order of the items of content having been set by the user. Once the decision button is activated, various items of content having been input via the comment inputting screen are transmitted to the site A along with various comments corresponding to the various items of content, and the process goes to a next operation (program file registration) as described earlier. The comments input via the comment inputting screen are stored as basic information (see FIG. 3) of the corresponding items of content. While the corresponding item of content is being reproduced during reproduction of the program, the comment is displayed in the basic information displaying area on the operation panel as shown in FIG. 4. This display operation corresponds to the already-described operation of step 14 (or step 22) of FIG. 6B and thus will not be described here to avoid unnecessary duplication.

The user program file having been created as above can be used by any interested user as long as the interested user is duly authorized to use the file. Specifically, at already-described step 5 and step 6 of FIG. 6, the site program list files and user program list files stored in all the user databases UDB of FIG. 6A are sent from the site A to the client terminal PC1, so that all the program files in the site A are displayed in the program displaying/selecting area on the operation panel as shown in FIG. 4. Reproduction of the user program file will not be described here because it may be carried out in the same manner as the already-described program file reproduction; that is, the reproduction operations have already been described in relation to step 20 (or 21) of FIG. 6B to step 28 of FIG. 6C. However, whereas the original program files (corresponding to the user program files) are stored in the client terminals PC1–PCn in the first embodiment, the user program files are stored in the sites A–N in this second embodiment, and thus in the second embodiment, the reproduction operations are modified, in any event, to download the user program files from the sites A–N.

The above-described embodiment can create a program using user's original content and deliver the thus-created program to another user (or client terminal PC of the other user), by allowing the site not only to create and store a program file on the basis of selection and setting of content made via the client terminal PC but also to register user-created content in the site. Therefore, the following paragraphs describe processing in which the user uploads user content from the client terminal PC to the site, i.e. the user registers user content into the site.

Figure 14:
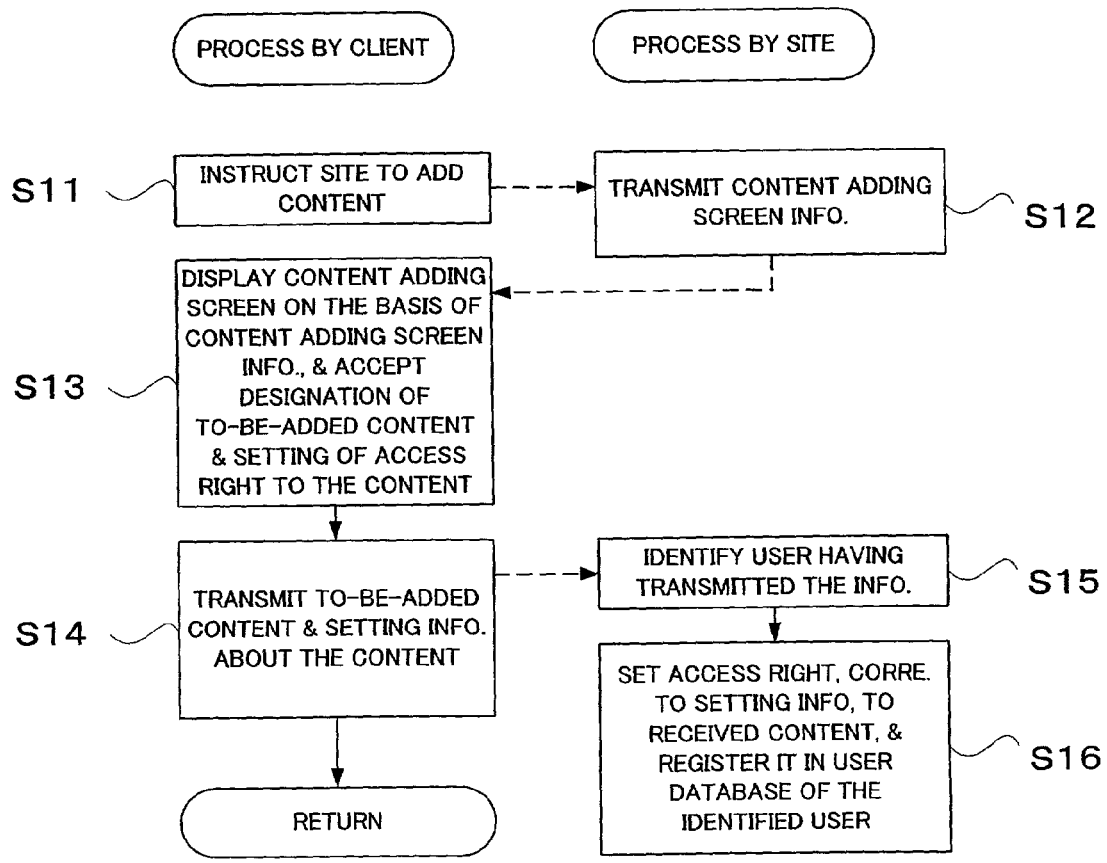
FIG. 14 is a flow chart showing an example of a content addition process carried out in the program reproduction system shown in FIG. 10.

FIG. 14 is a flow chart showing an example of a content addition process, which is started up or triggered in response to activation of a "content adding button" (not shown) displayed on the operation panel of FIG. 4. Whether or not the content adding button has been activated may be detected, for example, following the operation at step 3, 7 or 32 of FIG. 6.

At step S11 of FIG. 14, the user instructs, via the predetermined client terminal PC1, the desired site A to start operations for adding an item of content. In response to the content addition instruction from the predetermined client terminal PC1, the site A transmits content adding screen information to the client terminal PC1, at step S12. The client terminal PC1 receives the content adding screen information from the site A, displays a content adding screen (to be later described) and is now ready to accept user's designation of an item of content to be added and setting of a right to access (access right to) the item of content, at step S13.

Figure 15:
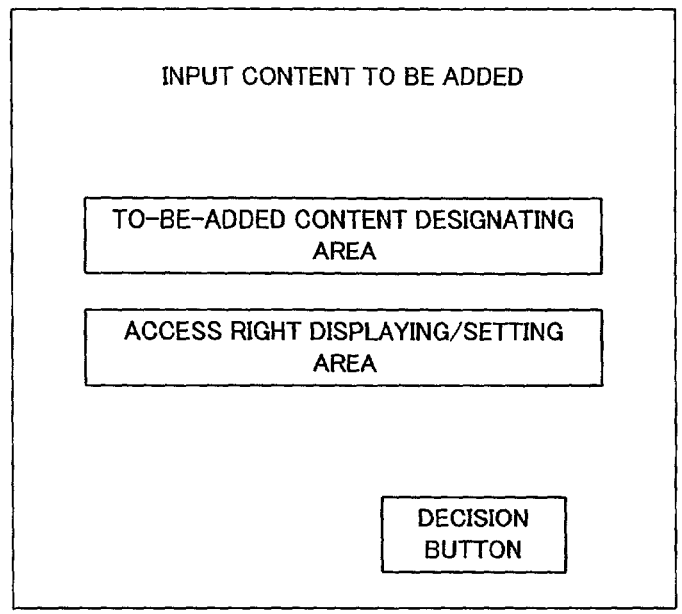
FIG. 15 is a diagram schematically showing an example of a content adding screen.

Here, a brief description is made about the content adding screen, with reference to FIG. 15 showing an example of the content adding screen. The content adding screen is displayed on the basis of the content adding screen information received from the site A. As shown in FIG. 15, the content adding screen includes a to-be-added content designating area and an access right displaying/setting area. The to-be-added content designating area allows the user to designate an item of content to be added by designating an address in the client terminal PC, external storage device or the like where the to-be-added content is currently stored. In this case, a plurality of items of content can be designated. The access right displaying/setting area displays a listing of all users registered in the site A, and each user to be authorized to use the to-be-currently-added content is selected from among the listed users. Information pertaining to the users is included in the content adding screen information.

Referring back to FIG. 14, once the addition and setting of the content have been decided or confirmed (i.e., completed), the client terminal PC1 transmits the to-be-added content and setting information (such as information related to the access right) about the content to the desired site A, at step S14. The site A identifies the user having transmitted the to-be-added content and setting information at step S15, and the site A also sets the access right, corresponding to the setting information, to the received content and registers the thus-set access right in the user database UDB of the identified user at step S16. That is, the site A registers (i.e., stores) the content, received from the client terminal PC1, into the dedicated user database UDB of the user having transmitted the content, at which time the access right to the content is set on the basis of the setting information accompanying the content and registered along with the content. For example, this access right is information prescribing whether or not another interested user should be allowed to create a new user program file using the content in question, and the access right may be registered along with the content in question or a plurality of such access rights together as management information.

Figure 16:
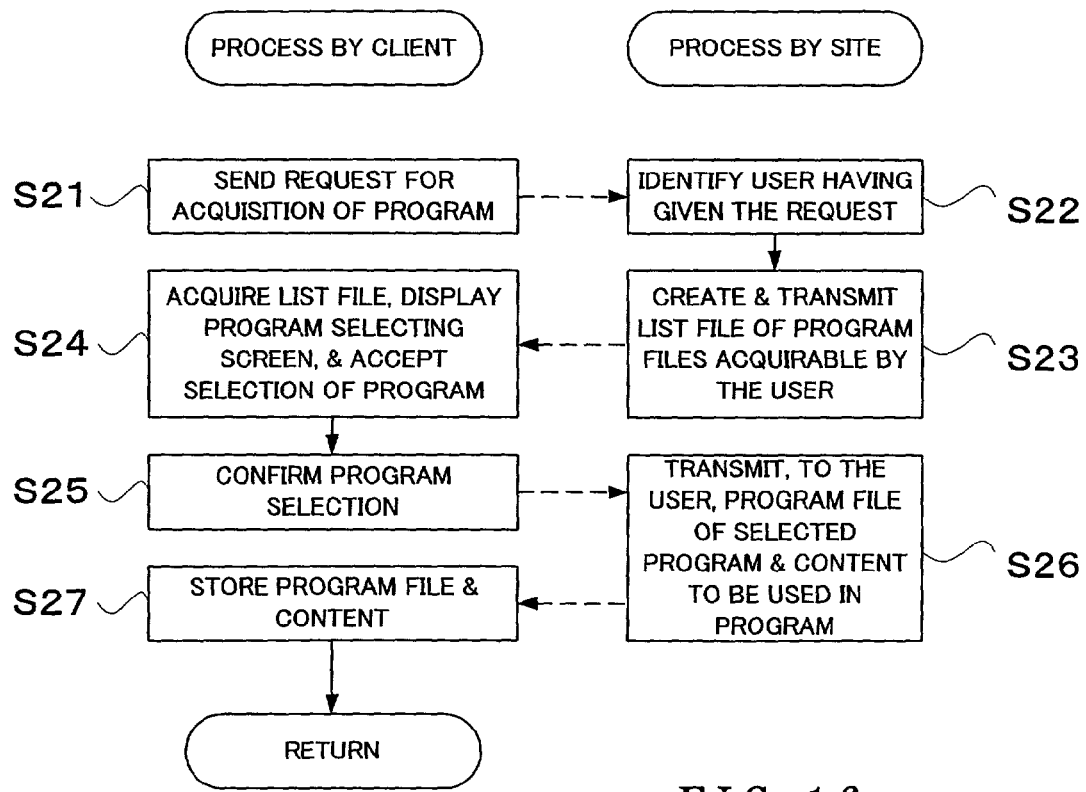
FIG. 16 is a flow chart showing an example of a program file acquisition process carried out in the program reproduction system shown in FIG. 10.

The following paragraphs describe a process for acquiring a user-created original program file, with reference to FIG. 16 that is a flow chart showing an example of the program file acquisition process. This example of the program file acquisition process is arranged such that when the user wants a program file downloaded from the site A, a listing of only programs downloadable by the user is displayed on the operation panel (FIG. 4) of the client terminal PC1 so that the user can select a desired program from among the listed downloadable programs. This program file acquisition process is started up in response to activation of a "program acquiring button" (not shown) also displayed on the operation panel of FIG. 4. Whether or not the program acquiring button has been activated may be detected, for example, following the operation of step 3, 7 or 32 of FIG. 6.

Once the client terminal PC1 sends a request for a desired program to the site A at step S21, the site A, at step S22, identifies the user of the client terminal PC1 having sent the request for the desired program, on the basis of the user identification information, at step S22. If the user has been identified correctly, i.e. if the user has been identified as one authorized to access the site A, the site A creates a listing of program files acquirable by the user (i.e., program list file listing all program files acquirable by the user) and transmits the thus-created listing to the client terminal PC1, at step S23. Namely, in this embodiment, the user is allowed to acquire only user program files created by the user in question.

After acquiring such a program list file, the client terminal PC1 displays a program selecting screen on the operation panel and accepts a selection, by the user, of a desired program, at step S24. The program selecting screen is not shown in the drawings because it is substantially similar to the content selecting screen of FIG. 12; however, this program selecting screen is different from the content selecting screen in that it includes a "program file displaying/selecting area" in place of the "content displaying/selecting area" of FIG. 12. In the "program file displaying/selecting area" of the program selecting screen, there is displayed a listing of all programs selectable by the user. Then, when the user selects a desired program, from among the listed programs, using the program selecting screen and confirms the program selection at step S25, the program file of the selected desired program and content to be used in the program are transmitted from the site A to the client terminal PC1 at step S26. Namely, the site A transmits, to the user of the client terminal PC1, the user-selected program file and all items of content to be used in the program. In turn, the client terminal PC1 receives and stores the transmitted program file and content at step S27. By thus storing the transmitted program file and content, the client terminal PC1 is allowed to reproduce the program based on the received program file, at any desired time, without having to again access the site A (i.e., on an offline basis). Further, on the user's own site run independently by the client terminal PC1 alone, the program can be made public to any other interested user. In such a case, a program reproducing computer program for performing the reproduction process of FIG. 6 is downloaded from the site A so that the program file can be reproduced on the user's own site; that is, the operation of the site A is carried out by the user's client terminal PC1.

Whereas the embodiment has been described above as displaying the listing of only the programs downloadable by the user to allow the user select a desired one of the listed programs, the present invention is not so limited. For example, a listing of all the programs stored in the site may be displayed, and arrangements may be made such that the site permits downloading of a desired program downloadable by the user but, for any non-downloadable program, displays predetermined information about a user possessing the program (owner of the program) so that the program can be downloaded through operations separate from the above-mentioned. Therefore, another example of the program file acquisition process will be described below.

Figure 17:
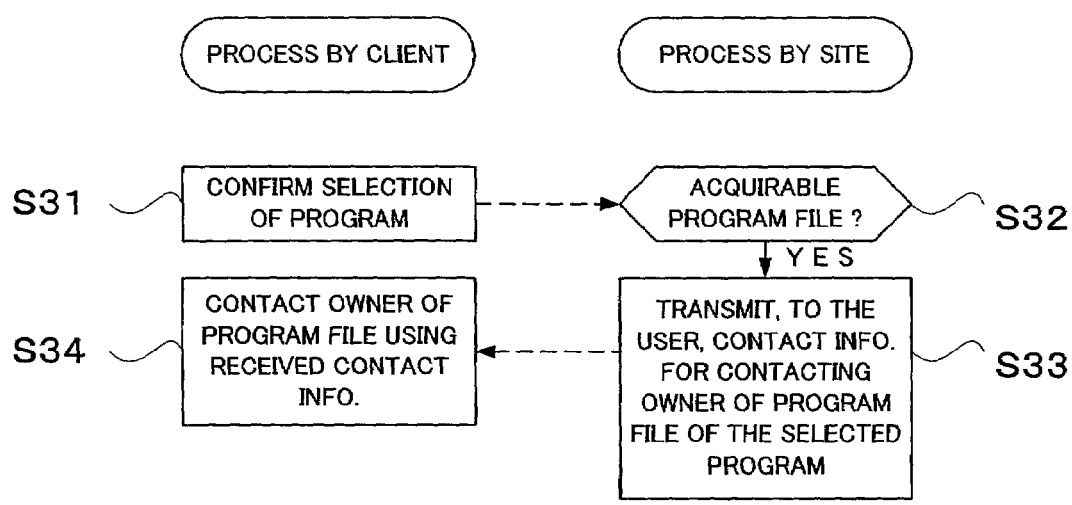
FIG. 17 is a flow chart showing another example of the program file acquisition process carried out in the program reproduction system shown in FIG. 10.

FIG. 17 is a flowchart showing another example step sequence of the program file acquisition process. The program file acquisition process of FIG. 17 is a process in accordance with which a listing of all the programs currently stored in the site is displayed on the operation panel of the client terminal PC and, for any non-downloadable program, the site makes arrangements for allowing the client terminal PC to display predetermined information such that the user of the client terminal PC can negotiate with another user possessing the desired program (the owner of the desired program) for downloading of the program. Let it be assumed here that each user can set an access right, as appropriate, to a user program file created by the user. The list file transmitted from the site to the client terminal PC is intended to allow the client terminal PC to display all the program files stored in the site in such a manner that the user of the client terminal PC can select a desired one of the displayed program files. The operations for the program file display and selection are not illustrated in its entirety in the drawings because they are similar to those in the already-described program file acquisition process of FIG. 16, and only operations following the program file selection, corresponding to the operation of step S24 of FIG. 16, are illustrated in FIG. 17. Further, operations to be performed when the selected program file is acquirable (downloadable), such as a user program file possessed by the user in question or a user program file of another user which the user in question is already authorized to access, are similar to those of FIG. 16 and thus will not be described here to avoid unnecessary duplication.

Once a desired program has been selected and the program selection has been confirmed on the client terminal PC1 at step S31, the site A makes a determination, at step S32, as to whether the program file of the selected desired program is one acquirable by the user. If the program file of the selected desired program is one acquirable by the user (YES determination at step S32), the site A transmits, to the client terminal PC1, contact information to allow the user to contact the user possessing the program file of the selected program (the owner of the program file), at step S33. In turn, the client terminal PC1 displays the contact information received from the site A so as to prompt the user to contact the user possessing the program file of the selected program on the basis of the contact information, at step S34. The contact information includes an e-mail address, residence address, phone number and the like of the program-file possessing user; as a safeguard against leakage of personal information, communication between the users may be executed, for example, through a bulletin board by way of the site. Namely, in the situation where the user-selected program is a non-acquirable program file, such as a site program file or a user program file possessed by another user for which the user in question has not been granted an access right, the user can be given the access right to the selected program by negotiating with the owner of the program file.

In the instant embodiment arranged in the above-mentioned manner, each newly-created user program file is stored and added to the program list (site program list file and user program list file) that is made public by the site, and the program list is presented to the client terminal of an interested user. With such arrangements, the contents of the programs made public by the site can be diversified to a significant degree.

Further, in the described embodiment, each item of content received from a client terminal is stored in association with utilization management information (namely, access right) of the item of content, and control is performed such that at the time of creation of a program file, a creator can select only an item of content usable by the program file creator. Thus, the number of the types of content usable for creation of the program file can be increased as necessary and it is possible to prevent any other client from using the content, created (added) by the creator, without due permission. Therefore, the arrangements of the embodiment are very useful for preventing copyright infringement in cases where the content in question is music or picture data.

Further, in the described embodiment, each program file is stored in association with utilization management information (namely, access right) of the program file, and control is performed such that at the time of acquiring a desired program file, a client can select only from among program files acquirable by the client. In this way, the client can acquire the desired program file, reproduce the program by itself without having to be connected again to the site and also make arrangements for preventing any other user from using the program file, created by the client, without permission. In this respect too, the arrangements of the embodiment are very useful for preventing copyright infringement.

Whereas the embodiment has been described above as restricting the content that can be used by an interested user in creating a user program file, the content use restriction may be eliminated so that the user is allowed to create a user program file using the content present in all the databases of the site. However, it is most preferable to employ the content use restriction scheme, as set forth above in relation to the embodiment. Further, the embodiment has been described above presenting to the user only items of content that can be used by an interested user in creating a user program file. In an alternative, where all of the items of content present in the databases of the site are presented to the user and the user selects, from among the presented items of content, a desired item of content which the user has not been given permission to use, arrangements may be made for allowing the user to contact the owner of the desired item of content and get permission to use the desired item of content. Such arrangements can be made by performing operations similar to those of the program file acquiring process shown in FIG. 17.

It should also be appreciated that the user program file may include other additional information than stated in the described embodiment, such as a name, creator, creation date, etc. of the program, comments about contents of the program. These pieces of additional information are reproduced and displayed together with reproduction of the program file. For example, the additional information may be displayed in the basic information display area on the operation panel shown in FIG. 4. The additional information is not necessarily limited to text information and may be picture or sound information for visual or audible reproduction and display.

It is preferable that the owner of a user program file be capable of setting utilization management information (e.g., access right) with respect to use by other persons and attach the utilization management information to the user program file. As described above in relation to the program file acquiring process of FIG. 17, the utilization management information representative of the access right may be attached to the user program file during creation of the user program file and subsequently freely modified only by the file owner and manager or administrator of the site as necessary. Further, the utilization management information (e.g., access right) related to the content may be freely modified only by the file owner and manager or administrator of the site after attachment to the content.

Although the second embodiment of the present invention has been described above as transmitting, to the client terminal, content itself to be used in a selected program file so that the client terminal reproduces the content to allow the user to view or listen to the program, the present invention is not so limited. For example, the site or server may sequentially reproduce content to be used in a selected program file, without transmitting the content itself to the client terminal, and may transmit the reproduced content to the client terminal to allow the user to view or listen to the program.

The present invention arranged in the above-described manner is characterized in that a client terminal or apparatus prestores a program file including various content information such as content URLs and reads out, from a server, necessary items of content, one by one or collectively, on the basis of the program file so as to reproduce the program. Thus, even in the case of a program comprising a mixture of a plurality of items of content having different characters, the present invention can appropriately reproduce the program. As a result, the present invention can advantageously create a program having diversified contents.

Further, because the present invention allows any interested listener/viewer to freely create and make public an original program, it can greatly diversify the contents of programs made public by a site.

What is claimed is:

1. A program creation/supply apparatus connectable with a client apparatus via a communication network, said program creation/supply apparatus not only making a program file, defining one or more items of content, available to a plurality of client apparatuses, connected to the communication network, as content on a predetermined site, but also delivering the program file in response to a request from any one of the client apparatuses, said program creation/supply apparatus comprising:

a storage section that stores a plurality of items of content and a program file defining one or more items of content; and a processor section coupled with said storage section and adapted to:

prompt the client apparatus to select one or more items of content and to input desired additional information in correspondence with the one or more items of content selected by the client apparatus, said additional information comprising a user's comment to be displayed in a client apparatus while a selected corresponding item of content is being reproduced in the client apparatus;

create a program file defined by the selected one or more items of content and including additional information, on the basis of content selection information and the additional information transmitted from the client apparatus via the communication network;

store the created program file in said storage section, wherein the created program file stored in said storage section is not only usable by the client apparatus having created the program file or a user of the client apparatus, but also usable by another client apparatus or a user of the another client apparatus, so that the created program file is made available as content on the predetermined site;

prompt a client apparatus on the communication network to select a desired program file; and read out the selected desired program file from said storage section on the basis of content selection information transmitted from the client apparatus via the communication network and transmit the selected desired program file to the client apparatus.

2. A program creation/supply apparatus as claimed in claim 1 wherein said processor section allows a user of the client apparatus to select, from among the plurality of items of content stored in said storage section, only an item of content having been preset as usable by the user.

3. A program creation/supply apparatus as claimed in claim 1 wherein said processor section supplies the client apparatus with a listing of usable items of content so that the client apparatus prompts a user of the client apparatus to select one or more desired items of content from the listing via the client apparatus.

4. A program creation/supply apparatus as claimed in claim 1 wherein said processor section supplies the client apparatus with browser screen information so that the client apparatus prompts a user of the client apparatus to input desired additional information via the client apparatus.

5. A program creation/supply apparatus as claimed in claim 1 wherein said processor section is adapted to, in response to a request of the client apparatus, read out a program file from said storage section and transmit the program file to the client apparatus, and said processor section is further adapted to read out one or items of content, defined by the transmitted program file, from said storage section and transmit the one or items of content to the client apparatus.

6. A program creation/supply apparatus as claimed in claim 1 wherein said storage section contains a plurality of types of content.

7. A program creation/supply apparatus as claimed in claim 1 wherein when the program file including the additional information is reproduced, the additional information is reproduced together with the program file.

8. A program creation/supply apparatus as claimed in claim 1 wherein the additional information is visual information, and when the program file including the additional information is reproduced, the additional information is visually displayed on a display device.

9. A program creation/supply apparatus as claimed in claim 1 wherein the program file defines reproducing order of a plurality of items of content.

10. A program creation/supply apparatus as claimed in claim 1, wherein said processor section is further adapted to read out one or items of content, defined by the selected desired program file, from said storage section and transmit the one or items of content to the client apparatus.

11. A program creation/supply apparatus connectable with a client apparatus via a communication network, said program creation/supply apparatus not only making a program file, defining one or more items of content, available to a plurality of a plurality of client apparatuses, connected to the communication network, as content on a predetermined site, but also delivery the program file in response to a request from any one of the client apparatuses, said program creation/supply apparatus comprising:

a storage section that stores a plurality of items of content and a program file defining one or items of content; and a processor section coupled with said storage section and adapted to:

receive an item of content from the client apparatus via the communication network and additionally store the received item of content in said storage section;

prompt the client apparatus to select one or more desired items of content from among the items of content, including the additionally stored item of content, stored in said storage section, and to input desired additional information in correspondence with the one or more items of content selected by the client apparatus, said additional information comprising a user's comment to be displayed in a client apparatus while a selected corresponding item of content is being reproduced in the client apparatus;

create a program file defined by the selected one or more desired items of content and including additional information, on the basis of content selection information and the additional information transmitted from the client apparatus via the communication network;

store the created program file in said storage section, wherein the created program file stored in said storage section is not only usable by the client apparatus having created the program file or a user of the client apparatus, but also usable by another client apparatus or a user of the another client apparatus, so that the created program file is made available as content on the predetermined site;

prompt a client apparatus on the communication network to select a desired program file; and read out the selected desired program file from said storage section on the basis of content selection information transmitted from the client apparatus via the communication network and transmit the selected desired program file to the client apparatus.

12. A program creation/supply apparatus as claimed in claim 11 wherein said processor section allows a user of the client apparatus to select, from among the plurality of items of content stored in said storage section, only an item of content having been preset as usable by the user.

13. A program creation/supply apparatus as claimed in claim 11 wherein said processor section is adapted to, in response to a request of the client apparatus, read out the program file from said storage section and transmit the program file to the client apparatus, and said processor section is further adapted to read out one or items of content, defined by the transmitted program file, from said storage section and transmit the one or items of content to the client apparatus.

14. A program creation/supply apparatus as claimed in claim 11 wherein said processor section supplies the client apparatus with browser screen information to be used for adding a desired item of content, to thereby allow the client apparatus to transmit a desired item of content.

15. A program creation/supply apparatus connectable with a client apparatus via a communication network, said program creation/supply apparatus not only making a program file, defining one or more items of content, available to a plurality of a plurality of client apparatuses, connected to the communication network on a predetermined site, but also delivering the program file in response to a request from any one of the client apparatuses, said program creation/supply apparatus comprising:

a storage section that stores a plurality of items of content and a program file defining one or items of content; and a processor section coupled with said storage section and adapted to:

prompt the client apparatus to select one or more desired items of content and to input desired additional information in correspondence with the one or more items of content selected by the client apparatus, said additional information comprising a user's comment to be displayed in a client apparatus while a selected corresponding item of content is being reproduced in the client apparatus;

create a program file defined by the selected one or more desired items of content and including additional information, on the basis of content selection information and the additional information transmitted from said client apparatus via the communication network;

store the created program file in said storage section, wherein the created program file stored in said storage section is not only usable by the client apparatus having created the program file or a user of the client apparatus, but also usable by another client apparatus or a user of the another client apparatus, so that the created program file is made available as content on the predetermined site;

prompt a given client apparatus on the communication network to select a desired program file from among a plurality of program files, including the additionally stored program file, stored in said storage section; and download, to the given client apparatus, the selected desired program file and content defining the selected desired program file, on the basis of program file selection information transmitted from the given client apparatus via the communication network, wherein the given client apparatus can use the downloaded program file and content defining the downloaded program file on an offline basis.

16. A program creation/supply apparatus as claimed in claim 15 wherein when the given client apparatus having selected the desired program file is not the client apparatus that created the program file, said processor section is further adapted to determine whether or not the selected desired program file and content defining the selected desired program file may be downloaded to the given client apparatus.

17. A computer program embodied on a computer readable storage medium comprising computer program code for causing a computer to perform a method for creating and supplying a program by means of a program creation/supply apparatus connectable with a client apparatus via a communication network, said program creation/supply apparatus not only making a program file, defining one or more items of content, available to a plurality of client apparatuses, connected to the communication network, as content on a predetermined site, but also delivering the program filed in response to a request from any one of the client apparatuses, said program creation/supply apparatus including a storage a section that stores a plurality of items of content and a program file defining one or items of content, said method comprising:

A step of prompting the client to select one or more items of content and to input desired additional information in correspondence with the one or more items of content selected by the client apparatus, said additional information comprising a user's comment to be displayed in a client apparatus while a selected corresponding item of content is being reproduced in the client; and a step of creating a program filed defined by the one or items of content selected by the client apparatus and including additional information, on the basis of content selection information and the conditional information transmitted form the client apparatus via the communication network; a step of storing the created program file in said storage section, wherein the created program filed stored in said storage section is not only usable by the client apparatus having created the program file or a user of the client apparatus, but also usable by another client apparatus or a user of the another client apparatus, so that the created program file is made available as content the predetermined site; a step of prompting a client apparatus on the communication network to select a desired program file; and a step of reading out the selected desired program file from said storage section on the basis of content selection information transmitted form the client apparatus via the communication network and transmitting the selected desired program file to the client apparatus.

18. A computer program embodied on a computer readable storage medium comprising computer program code for causing a computer to perform a method for creating and supplying a program by means of a program creation/supply apparatus connectable with a client via a communication network, said program creation/supply apparatus not only making a program file, defining one or more items of content, available to plurality of client apparatuses, connected to the communication network, as content on a predetermined site, but also delivering the program file in response to a request from any one of the client apparatuses, said program creation/supply apparatus including a storage section that stores a plurality of items of content and a program file defining one or items of content, said method comprising: a step of receiving an item of content form the client apparatus via the communication network and additionally storing the received item of content in said storage section; a step of prompting the client apparatus to select one or more desired items of content form among the items of content, including the additionally stored item of content, stored in said storage section, and to input desired additional information in correspondence with the one or more items of content selected by the client apparatus, said additional information comprising a user's comment to be displayed in a client apparatus while a selected corresponding item of content is being reproduced in the client apparatus; and a step of creating a program file defined by the one or more desired items of content selected by the client apparatus and including additional information, on the basis of content selection information and the additional information transmitted form the client apparatus via the communication network; a step of storing the created program file in said storage section, wherein the created program file stored in said storage section is not only usable by the client apparatus having created the program file or a user of the client apparatus, but also usable by another client apparatus or a user of the another client apparatus, so that the created program file is made available as content on the predetermine site; a step of prompting a client apparatus on the communication network to select a desired program file; and a step of reading out the selected desired program file from said storage section on the basis of content selection information transmitted form the client apparatus via the communication network and transmitting the selected desired program file to the client apparatus.

19. A computer program embodied on a computer readable storage medium comprising computer program code for causing a computer to perform a method for creating and supplying a program by means of a program creation/supply apparatus connectable with a client apparatus via a communication network, said program creation/supply apparatus not only making a program filed, defining one or more items of content, available to plurality of client apparatuses, connected to the communication network, as content on a predetermined site, but also delivering the program file in response to request from any one of the client apparatus, said program creation/supply apparatus including a storage section that stores a plurality of items of content and a program file defining one or items of content, said method comprising: a step of prompting the client apparatus to select one or more desired items of content and to input desired additional information in correspondence with the one ore more items of content selected by the client in a client apparatus while a selected corresponding item of content is being reproduced in the client apparatus; a step of creating a program file defined by the one or more desired items of content selected by the client apparatus and including additional information, on the basis of content selection information and the additional information transmitted from the client apparatus via the communication network; a step of storing the created program file in said storage, wherein the created program file stored in said storage is not only usable by the client apparatus having created the program file or a user of the client apparatus, but also usable by another client apparatus or a user of the another client apparatus, so that the created program file is made available as content on the predetermined site; a step of prompting a given client apparatus on the communication network to select a desired program file from among a plurality of program files, including the additionally stored program file, stored in said storage section; and a step of downloading; to the given client apparatus, the selected desired program file and content defining the selected desired program file, on the basis of program file selection information transmitted from the given client via the communication network, wherein the given client apparatus can use the downloaded program file and content defining the downloaded program file on an offline basis.

* * * * *